(12) United States Patent
Sherman

(10) Patent No.: US 10,997,242 B2
(45) Date of Patent: May 4, 2021

(54) SYSTEM FOR CREATING DATA-CONNECTED APPLICATIONS

(71) Applicant: Brian Arthur Sherman, Chicago, IL (US)

(72) Inventor: Brian Arthur Sherman, Chicago, IL (US)

(*) Notice: Subject to any disclaimer, the term of this patent is extended or adjusted under 35 U.S.C. 154(b) by 234 days.

(21) Appl. No.: 15/895,620

(22) Filed: Feb. 13, 2018

(65) Prior Publication Data
US 2018/0232456 A1    Aug. 16, 2018

Related U.S. Application Data

(60) Provisional application No. 62/458,807, filed on Feb. 14, 2017.

(51) Int. Cl.
| | |
|---|---|
| *G06F 16/83* | (2019.01) |
| *H04L 12/24* | (2006.01) |
| *G06F 16/25* | (2019.01) |
| *G06F 8/30* | (2018.01) |
| *G06F 8/34* | (2018.01) |
| *G06F 8/38* | (2018.01) |
| *G06F 9/455* | (2018.01) |

(52) U.S. Cl.
CPC .............. *G06F 16/83* (2019.01); *G06F 8/30* (2013.01); *G06F 8/34* (2013.01); *G06F 8/38* (2013.01); *G06F 9/45508* (2013.01); *G06F 9/45529* (2013.01); *G06F 16/25* (2019.01); *H04L 41/0246* (2013.01)

(58) Field of Classification Search
None
See application file for complete search history.

(56) References Cited

U.S. PATENT DOCUMENTS

| | | | |
|---|---|---|---|
| 6,775,674 B1* | 8/2004 | Agassi | G06F 16/289 |
| 8,171,482 B1 | 5/2012 | Vlaovic et al. | |
| 2003/0120675 A1 | 6/2003 | Stauber et al. | |
| 2005/0005262 A1 | 1/2005 | Mohan et al. | |
| 2005/0278365 A1* | 12/2005 | Boucousis | G06F 16/367 |
| 2006/0143220 A1 | 6/2006 | Spencer, Jr. | |
| 2009/0313004 A1 | 12/2009 | Levi et al. | |

(Continued)

OTHER PUBLICATIONS

International Search Report issued in PCT/US2018/018010 dated Apr. 23, 2018.

*Primary Examiner* — Wilson Lee
(74) *Attorney, Agent, or Firm* — DLA Piper LLP US

(57) ABSTRACT

A system for building a software application may comprise a database and a hardware processor. The database may be configured to store a plurality of object definitions, each object definition being configured to cause an executing processor to perform specific processing when executed. The hardware processor may be configured to cause a user interface to be displayed; receive, from the user interface, a selection of a plurality of the object definitions and an input specifying at least one relationship between the plurality of the object definitions; create an application definition based on the selection and the input; and provide an application interpreter configured to enable the executing processor to process the application definition. The software application may include the application definition and the application interpreter.

20 Claims, 23 Drawing Sheets

(56) References Cited

U.S. PATENT DOCUMENTS

| | | | |
|---|---|---|---|
| 2011/0022974 A1* | 1/2011 | Kinoshita | H04M 1/72583 715/764 |
| 2011/0099532 A1 | 4/2011 | Coldicott et al. | |
| 2011/0283267 A1* | 11/2011 | Waite | G06F 11/3672 717/135 |
| 2012/0179426 A1* | 7/2012 | Fontes | G06F 17/5018 703/1 |
| 2012/0331472 A1* | 12/2012 | Moon | G06F 16/29 718/102 |
| 2014/0033011 A1* | 1/2014 | Wandeler | G06F 17/243 715/222 |
| 2014/0033083 A1* | 1/2014 | Nack | G06F 7/00 715/763 |
| 2015/0095882 A1* | 4/2015 | Jaeger | G06F 8/34 717/109 |
| 2015/0113042 A1* | 4/2015 | Gonzalez, Jr. | G06F 16/00 709/203 |
| 2015/0281333 A1* | 10/2015 | Albert | H04L 67/38 715/744 |
| 2015/0310041 A1* | 10/2015 | Kier | G06F 16/5854 463/33 |
| 2016/0092179 A1 | 3/2016 | Straub et al. | |
| 2016/0124924 A1* | 5/2016 | Greenberg | G06F 17/2247 715/738 |
| 2016/0179897 A1* | 6/2016 | Zheng | G06F 16/248 707/722 |
| 2016/0313958 A1* | 10/2016 | Guadarrama | G06F 3/1407 |
| 2017/0041296 A1* | 2/2017 | Ford | H04W 12/02 |
| 2017/0180487 A1* | 6/2017 | Frank | G06F 11/3688 |

\* cited by examiner

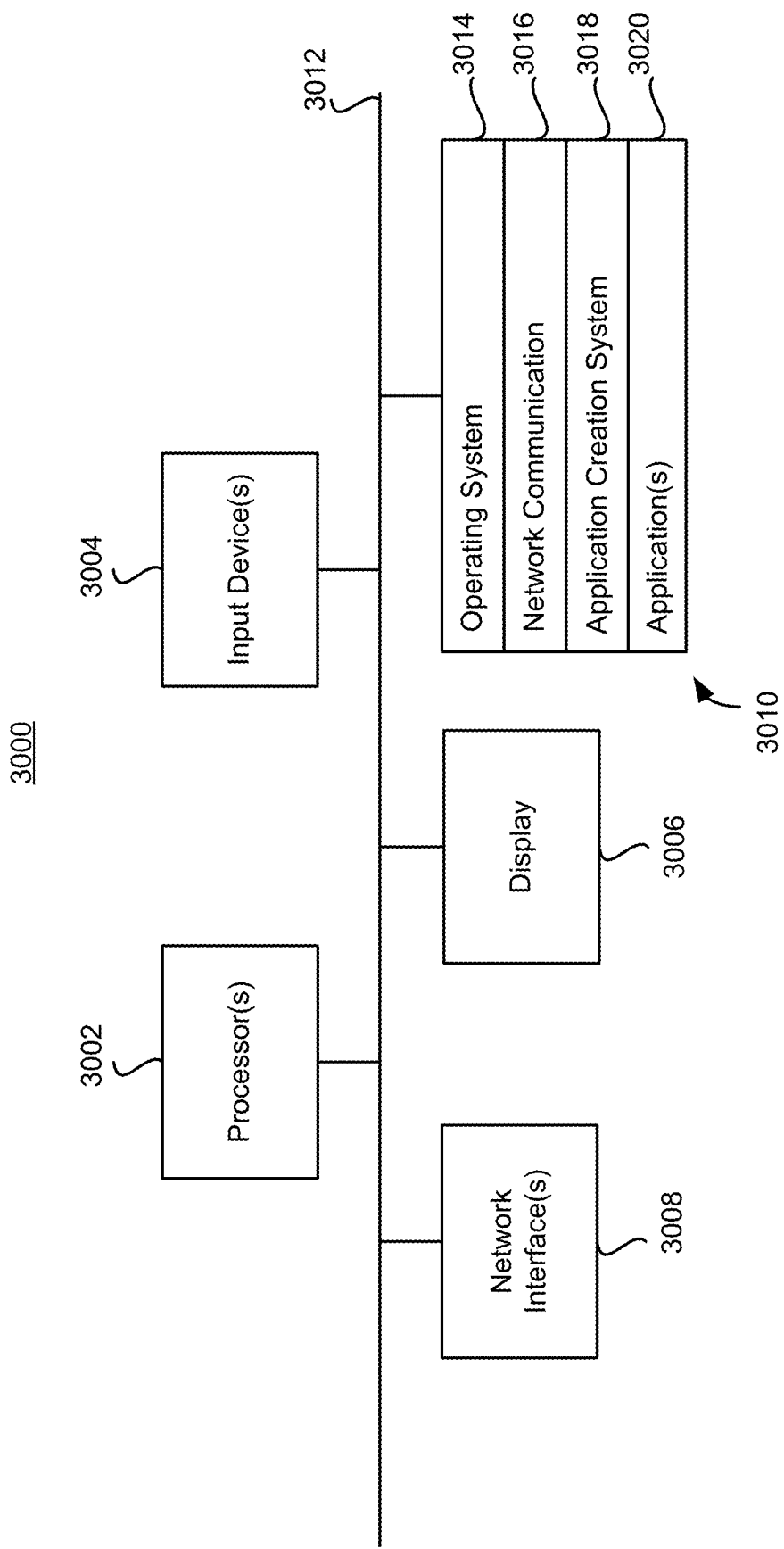

SYSTEM FOR CREATING DATA-CONNECTED APPLICATIONS

CROSS-REFERENCE TO RELATED APPLICATION

This application claims priority from U.S. Provisional Application No. 62/458,807, entitled "System for Creating Data-Connected Applications," filed Feb. 14, 2017, the entirety of which is incorporated by reference herein.

BACKGROUND

As the availability of personal computers and computing devices has grown, data-connected software applications with user interfaces have grown increasingly familiar to a broad range of people. Accordingly, many people and businesses have ideas for implementing applications of this type but lack the skills or resources to implement their ideas. Many systems have been developed to aid in the development of this type of application. However, these systems present many deficiencies.

Basic graphical user interface (GUI) platforms and libraries like the Java Swing framework, Microsoft .NET framework and the document object model of a web browser offer a developer a number of GUI components that may be used to build an interface for an application. However, a developer using a GUI platform or library is still required to have a high level of programming skill and knowledge of a programming language to implement such a system.

Web browsers have evolved to be similar to a GUI platform. Web pages have evolved from the early static web site model, to dynamic web pages using a distributed system requiring server interactions to control the appearance and behavior of an application, and now to single page web applications that can act as stand-alone applications using a server only to retrieve data etc. as required. These single page web applications use the document object model (DOM) of a web browser like a GUI platform. As the speed of personal computers and mobile devices like smart phones and tablets has increased, the implementation of single page web applications has also increased. Accordingly, many people and businesses have ideas for implementing applications of this type, but lack the skills or resources to implement their ideas.

Systems have been developed that create dynamic web applications using distributed systems. Content management systems (CMS) may provide a developer with templates, defined on and processed by a web server, that may be modified without the use of code by defining parameters. However, the ways that these templates may be modified are limited by the nature of the templates. Developers using such systems quickly find limitations that can only be overcome by writing custom code. Also, the use of a distributed system like this is costly, slow and unnecessary, when similar, single page web applications can be built.

Applications like Bootstrap Studio have been developed that allow a developer to build a web page by arranging a limited number of predefined components. This type of system provides a developer a higher level of control over the appearance of a web page but drastically limits a developer's ability to control the behavior of a page without writing custom code. This type of system also does not offer a user any way of storing data or accessing resources external to an application, without writing custom code and developing server applications.

SUMMARY

Embodiments of a system for describing a software application using property/value fields that may be easily described by known data description languages like JSON and XML, and stored in a database, and a procedure for executing a software application using this type of description are provided. An embodiment for creating web applications is provided.

Embodiments of a system for describing a software application service using property/value fields that may be easily described by known data description languages like JSON and XML, and stored in a database, and for providing a number of application services using a single multi-tenant application service are also provided. Application services may provide an application with capabilities not made available by a platform API. For instance, an application service may allow an application to interact with a database or to generate other applications. An embodiment for creating web services is provided.

Embodiments of a system for generating software applications and software application services that may generate other software applications and software application services are provided. Embodiments of a system that may facilitate the creation of data-connected applications and families of related applications, by supporting an iterative process wherein one application may be used to create a second application that may be used to create a third application and so on, are also provided below. Embodiments of a system that may allow for the creation of a variety of specialized tools for creating different types of applications that may be specialized to appeal to different types of users with different needs and levels of skill are also provided. An embodiment for generating web applications and web services is also provided.

BRIEF DESCRIPTION OF THE DRAWINGS

In the drawings, closely related figures have the same number but alphabetic suffixes.

FIG. 30 is an example block diagram of a system architecture configured to implement the features and functions described in FIGS. 1-28.

DETAILED DESCRIPTION OF SEVERAL EMBODIMENTS

Figure 1A:
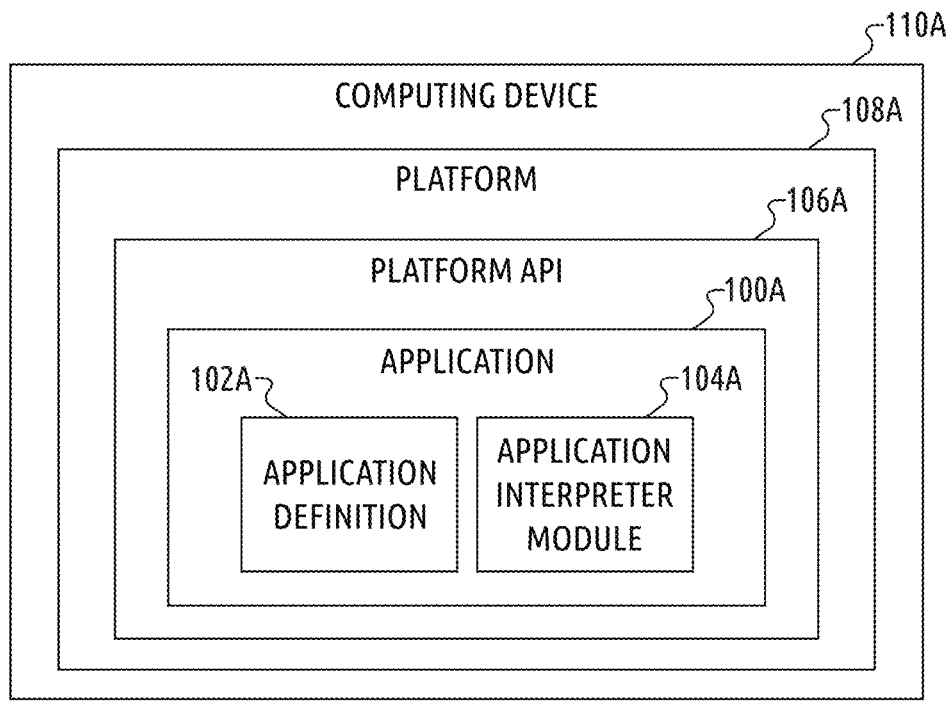
FIG. 1A is an example block diagram showing components of an application.

Application—FIG. 1A

Embodiments of a system for describing a software application using property/value fields that may be easily described by known data description languages like JSON and XML, and stored in a database, and a procedure for executing a software application using this type of description are provided.

FIG. 1A is a block diagram showing runtime modules of an application 100A generated using the methods described below. An application definition 102A, an application interpreter module 104A, and a platform API 106A may comprise runtime modules of an application.

The application 100A may be a stand-alone program or a component of a larger application. Many component applications of this type may be processed by the application interpreter module 104A within a single parent application. An application used as a component of a larger application may be described as a sub-application or as rich data.

During the runtime of the application 100A, the application interpreter module 104A may use the application definition 102A to execute the application 100A by interacting with the platform API 106A. The platform API 106A may be implemented by a process, sub-process, or any number of sub-processes of a platform 108A. The platform API 106A may provide an interface used to interact with the platform 108A. The platform 108A may be a process, or any number of processes that may provide methods to interact with a computing device 110A. During the runtime of the application 100A the platform 108A may interact the computing device 110A to perform functions of the application 100A.

Figure 2:
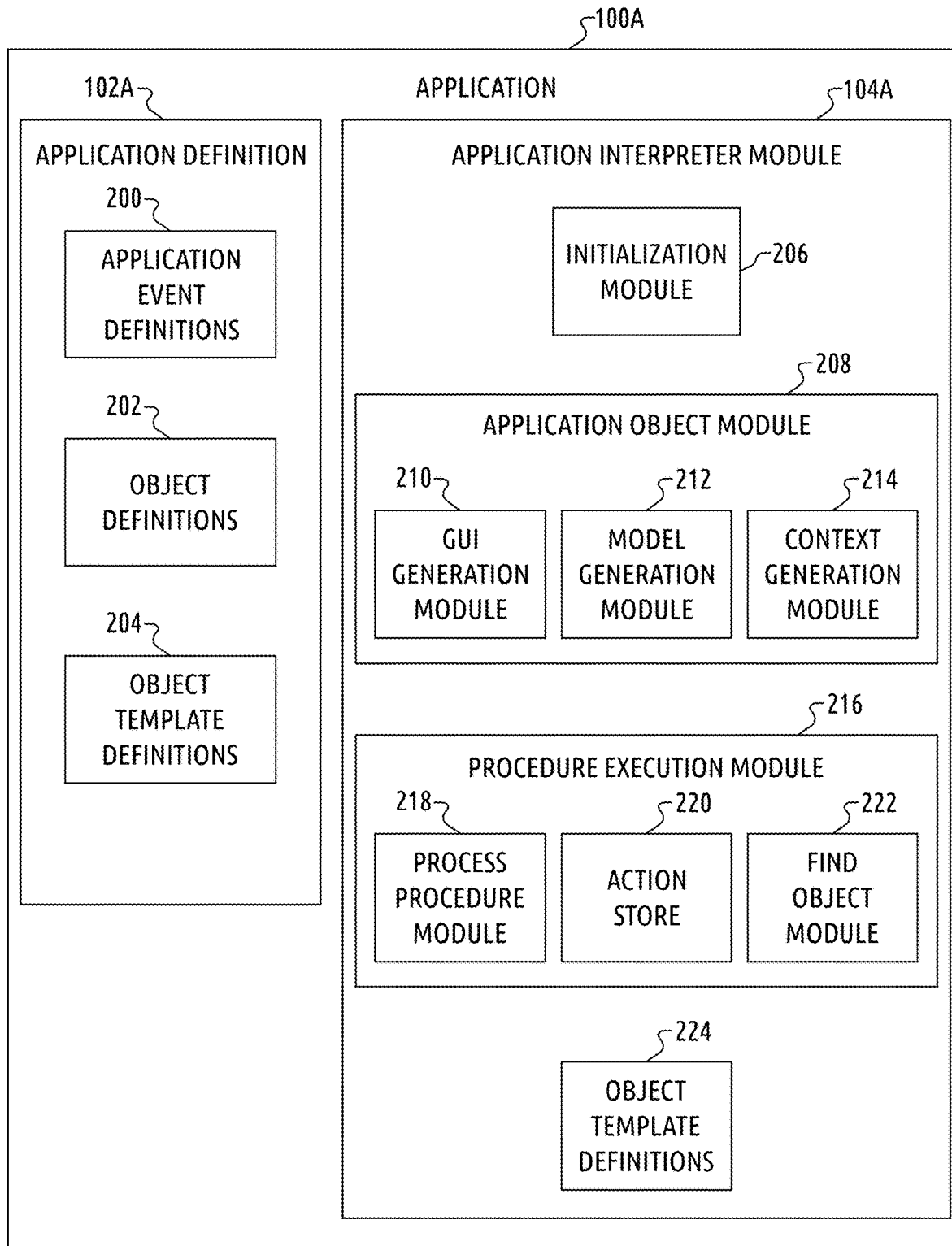
FIG. 2 is an example detailed block diagram showing components of an application.

Application Definition—FIG. 2

FIG. 2 is a block diagram showing components of the application definition 102A and application interpreter module 104A. The application definition 102A may contain information describing the application 100A. Aspects of the application 100A may be described using property/value fields that may be easily described by known data description languages like JSON and XML, and stored in a database. The syntax and fields of the application definition 102A may conform to specifications of the application interpreter 104A. The application definition 102A may comprise: a number of application event procedure definitions 200, a number of object definitions 202 and, a number of object template definitions 204.

Aspects of the application definition 102A may be hierarchical in nature. For instance, the application definition 102A may contain a number of GUI object definitions. A GUI object definition may contain a number of event procedure definitions or references to procedure definitions. An event procedure definition may contain a number of action definitions or references to them and so on. The nature of various aspects of an application definition will be described below in relationship to aspects of the application interpreter module 104A to which they relate.

Application Interpreter Module—FIGS. 1A-2

The application interpreter module 104A may use the application definition 102A to execute the application 100A by interacting with the platform API 106A. FIG. 2 shows components of the application interpreter module 104A. Sub-modules of the application interpreter module 104A may comprise: an initialization module 206, an application object module 208, a procedure execution module 216, and object template definitions 224.

Figure 3:
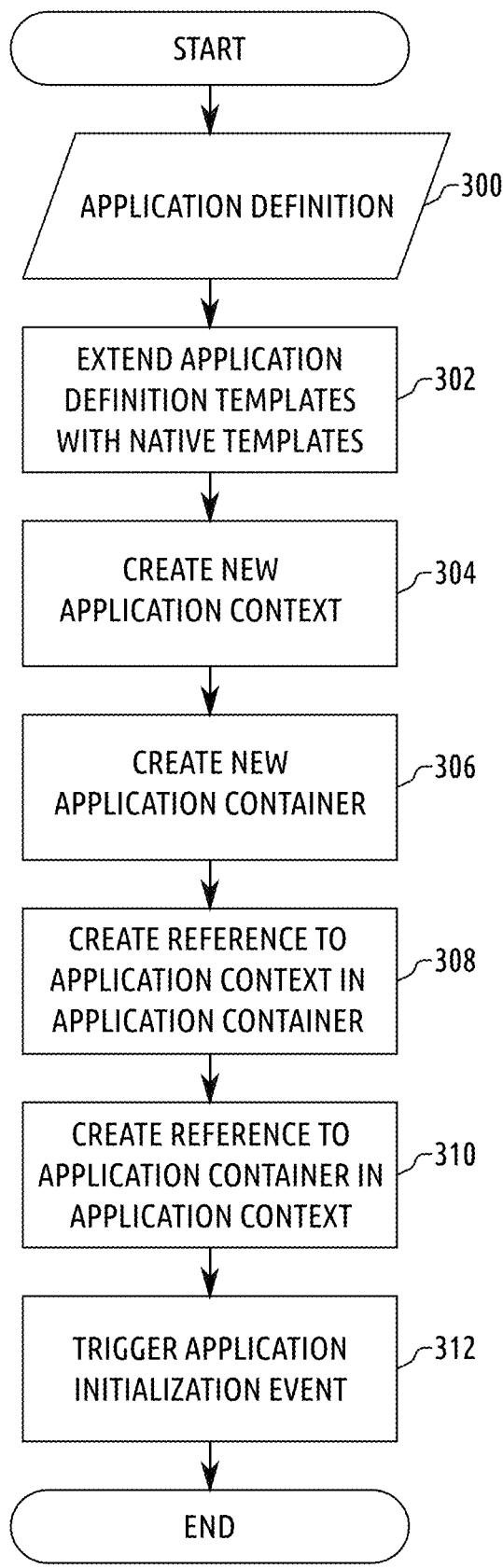
FIG. 3 is an example flow chart showing an application initialization procedure.

Initialization Module—FIGS. 2-3

When the application 100A is started, the application interpreter module 104A may perform an application initialization procedure using an initialization module 206. FIG. 3 shows an example application initialization procedure. In this embodiment, the application initialization procedure may first retrieve an application definition 300. Then, at 302, the application interpreter module 104A may prepare the application definition by extending object templates defined in it 204 with object templates defined in the application interpreter module 224. This process may generate one place that both types of object templates may be referenced. The application initialization procedure may then create an application context 304. An application context may hold references to the application definition and application container in addition to other objects. Next, an application container may be created 306. Next, a reference to the application context may be created in the application container 308 and a reference to the application container may be created in the application context 310. Next, an application initialization event procedure may be triggered 312. The application definition may contain an application initialization event procedure definition that may contain actions that create objects, register events to be triggered during the application's event loop and perform other functions. The actions of the application initialization event procedure may cause a series of other events to be triggered. The result of this series of events may generate the initial state of an application.

Figure 4:
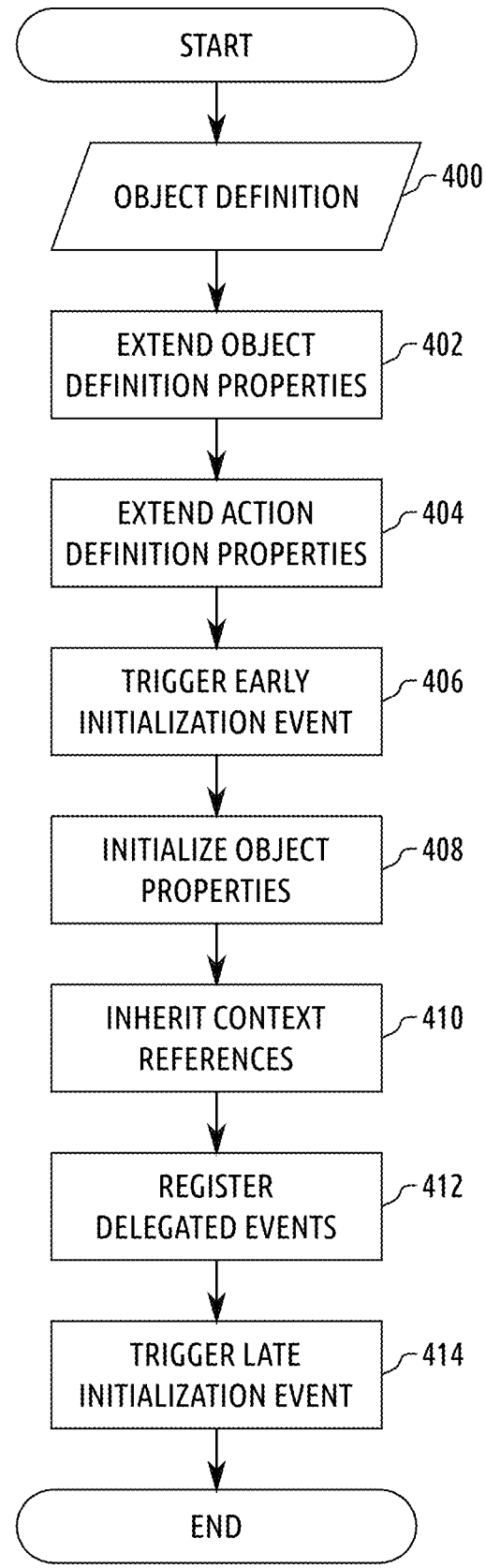
FIG. 4 is an example flow chart showing a general object generation procedure.

Application Object Module—FIGS. 2, and 4

During the execution of the application 100A, the application object module 208 may generate a number of different types of objects as described in the application definition 102A. The term object is used herein to describe non-transitory computer readable memory that may be referenced by procedures and that may comprise data that may be referenced by procedures. The term application object is used to distinguish an object generated by an application object module. An application object module 208 may comprise: a GUI object generation module 210, a model object generation module 212, and a context object generation module 214.

An object definition may describe an object using property/value fields that may be easily described by known data description languages like JSON and WL. Object definitions may be stored in an object definitions section 202 of the application definition 102A, in an action definition, or may be built during the execution of the application 100A. An object definition may specify references to object extension templates that may be used to augment the properties of the object definition. Object extension templates may be stored in an object template definitions section 204 of the application definition 102A. An object definition may also include a number of native event procedure definitions to be associated with application interpreter module defined events, custom procedure definitions, and arbitrary data. Properties specific to an object type being generated may also be included. These special properties will be described below. When an object is generated, its initial configuration may be determined by the properties of an object definition and the properties of an object that triggered the generation of the object.

An application object may be generated using an object generation module and an object definition. FIG. 4 shows a general object generation procedure. Although each object type may require additional steps and parameters, the procedures of an object generation module may include: accepting an object definition 400, extending the properties of the object definition with properties of object extension templates referenced in the object definition 402, extending the properties of action definitions contained in the object definition with properties of action extension templates referenced in action definitions 404, triggering an early initialization event 406, initializing the properties of the object 408, inheriting context references from another object if necessary 410, registering delegated events defined in the object definition 412, and triggering a late initialization event 414. An object generation module may also define default values that allow for application objects to be generated when an object definition is not provided.

When an application object is generated, a series of events may be triggered. For instance, an object definition may contain a late initialization event procedure definition that generates another object. When this object is initialized, the late initialization event procedure may be executed. When the late initialization event procedure is executed, a second object may be generated using a second object definition. The second object definition may also contain event procedure definitions that may generate other objects and so on.

The application definition 102A may describe the creation of references to objects. References to objects may be stored in objects. References to objects may be created when objects are generated or during the execution of procedures defined in the application definition 102A. Object references may create relationships between objects. Examples of references that may create relationships between objects may include: a reference to a parent object, references to any number of child objects, references to previous and next sibling objects in an ordered list, and a reference to a root object of a hierarchy of objects. Also, ad hoc object references may be created to facilitate the use of actions and the grouping of objects into application components. Ad hoc object references may be stored in property/value hashes or ordered lists.

Figure 5:
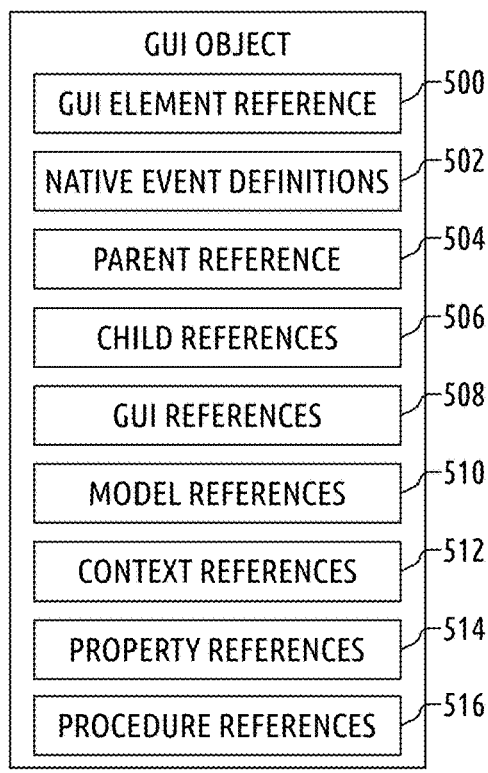
FIG. 5 is an example block diagram showing components of a GUI object.

GUI Object Generation Module—FIGS. 2, 4, and 5

The GUI object generation module 210 may generate GUI objects. In addition to performing the object generation procedures described above and in FIG. 4, the GUI object generation module 210 may also create a new GUI element, and create a reference to the new GUI element within a new GUI object. Alternatively, a GUI object generation module 210 may create a reference to a GUI element that already exists within an application. A GUI object generation module 210 may also cause a GUI object to inherit context references of another GUI object so that these references may be shared.

A GUI object may control the structure, appearance and behavior of a basic GUI element of the platform 108A. FIG. 5 shows components of a GUI object. GUI objects may be associated with a basic GUI element 500 of the platform 108A. For instance, in a platform like a web browser, that uses HTML elements to describe GUI elements, a GUI object may be associated with an HTML element. This might be a div element, button element, form input element, etc. A GUI object may also include a number of native event procedure definitions 502. For instance, there may be a "late initialization" event procedure definition that initializes child GUI objects at the end of a GUI object generation procedure, or a "fill field" event procedure definition that fills a text input with a value from a model property when it is triggered. A GUI object may also contain references to other GUI objects that may create relationships between them. These types of references may comprise: a parent GUI object reference 504, child GUI object references 506, and references to previous and next sibling GUI objects. Additionally, a GUI object may also include ad hoc object references. These types of references may comprise references to: other GUI objects 508, model objects 510, context objects 512, arbitrary property references 514, and procedure definition references 516.

A GUI object definition may describe a GUI object as described above. In addition to the general application object definition properties described above, a GUI object definition may include properties that describe a basic GUI element including: a GUI element type, attributes of a GUI element and GUI element text content. A GUI object generation module 210 may also include references to other GUI object definitions that may be used to generate other GUI objects associated with nested GUI elements. A GUI object definition might also include a number of delegated event procedure definitions to be associated with platform API events. Examples of platform API events may include on-click, on-change and on-mouse-over events. A GUI object definition may also include native event procedure definitions to be associated with application interpreter module defined events.

A GUI object may be the parent of other GUI objects. This type of GUI object may be called a container. A container may contain special references to its children 506, and a child GUI object may contain special references to its parent 504. As mentioned above, a GUI object definition may reference other GUI object definitions. The application interpreter module 104A may contain a "build container" action. When a "build container" action is called on a GUI object associated with a object definition containing references to other GUI object definitions, new GUI objects may be created for each GUI object definition referenced, relative to the parent GUI object. The GUI object associated with the GUI object definition containing the GUI object definition references is the parent, and the objects that are created are its children. Child GUI objects may inherit the context object references of their parent. These types of relationships may also be created through the use of actions and may allow for the creation of reusable application components.

An application container may be created during initialization of an application. An application container may be a GUI object or an object like a GUI object, but it may not be associated with a GUI element reference. The purpose of an application container is to serve as the parent of GUI objects that would not otherwise have a parent. These GUI objects may be thought of as base or root GUI objects. An application may have a number of application containers.

Figure 6:
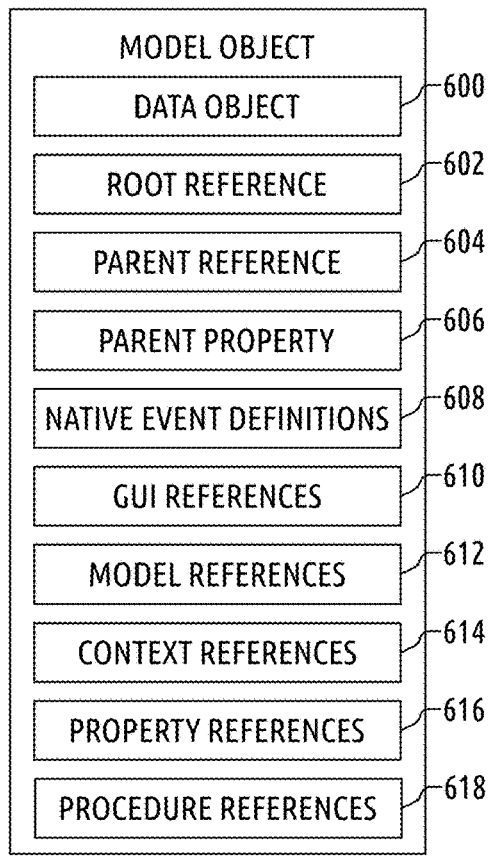
FIG. 6 is an example block diagram showing components of a model object.

Model Object Generation Module—FIGS. 2, 4, and 6

The model object generation module 212 may generate model objects. In addition to performing the object generation procedures described above and in FIG. 4, the model object generation module 212 may also initialize, retrieve, or reference a data object, and create a reference to the data object within a new model object. The model object generation module 212 may also cause a model object to inherit context references of another object so that these references may be shared.

Model objects may be associated with data and may provide methods for handling data associated with external and local resources. FIG. 6 shows components of a model object. A data object 600 may be associated with a model object. The data object 600 may represent data generated by an application, or data retrieved from a source outside of an application. A model object may contain special properties and references to other model objects that may create relationships between them. These types of properties and references may comprise: a root model object of a hierarchy of model objects 602, a parent model object reference 604, and a parent model property reference 606. A model object may also include a number of native event procedure definitions 608. Additionally, a model object may include ad hoc object references. These types of references may comprise references to: GUI objects 610, other model objects 612, context objects 614, arbitrary property references 616, and procedure definition references 618.

A model object definition may describe a model object as described above. In addition to the general application object definition properties described above, a model object definition may include properties that describe data represented by a model object. The properties required may depend on the type of data. A model object generation module may generate several different types of models to handle different types of data. Model object types may comprise: remote record, remote record buffer, local hash, and local array models.

A remote record model may be associated with a property/value representation of data retrieved from a source outside of an application or meant to be persisted to a source outside of an application. This data may represent a database record. A remote record model may be used to send database manipulation requests to an external application. These requests may cause an associated database record to be created, retrieved, updated, or deleted. A remote model object definition may include properties describing an outside data source, and parameters required to make requests on this data source.

A remote record buffer model may be associated with arrays of remote documents. Remote record buffer models may be used to retrieve filtered, sorted, and paginated groups of remote records from a source outside of an application. Remote record models may be created from records that comprise a remote document buffer. Record models may be retrieved from a record buffer to be consumed by an application and a record buffer may monitor the number of record models that it contains and maintain its own size. Remote record models that comprise a remote record buffer may be stored in a top buffer property and a bottom buffer property to allow them to be easily used to display ordered lists of record data. When records lower in a record buffer sort order are needed, models from the bottom buffer may be used. When records higher in a document buffer sort order are needed, models from the top buffer may be used. This may be very useful in displaying long lists of database results to a user. For instance, a record feed display component may be created to display paginated database results by repeatedly retrieving remote record models from a record buffer and creating GUI components to display data contained in these records. A remote record buffer model object definition may include properties describing an outside data source, parameters required to make requests on this data source, and record buffer query and size.

Local hash models and local array models may be associated with data that does not directly interact with an external data source. Local hash models are property/value representations of data. Local array models are ordered lists of data. Data represented by these types of models may either be generated during execution of an application or may represent a value of a property of a remote record model. This allows for nested data structures to be generated and manipulated. For instance, a remote record may represent a one to many relationship using a property with a value that is an array. A local array may be created to represent this array. If this model is modified in some way, the remote model may also be updated and an update request may be sent to an external server by the remote record model. If a local data model represents a nested data structure, it may include properties describing a parent model reference, and a reference to a property of the parent model that the new model will represent.

Context Object Generation Module—FIGS. 2, 4, 7, and 8

The context object generation module 214 may generate context objects. When a context object is generated, the object generation procedures described above and in FIG. 4 may be performed. However, context references may not be inherited by default. This may facilitate the use of context objects as a medium for application objects to share references.

Figure 7:
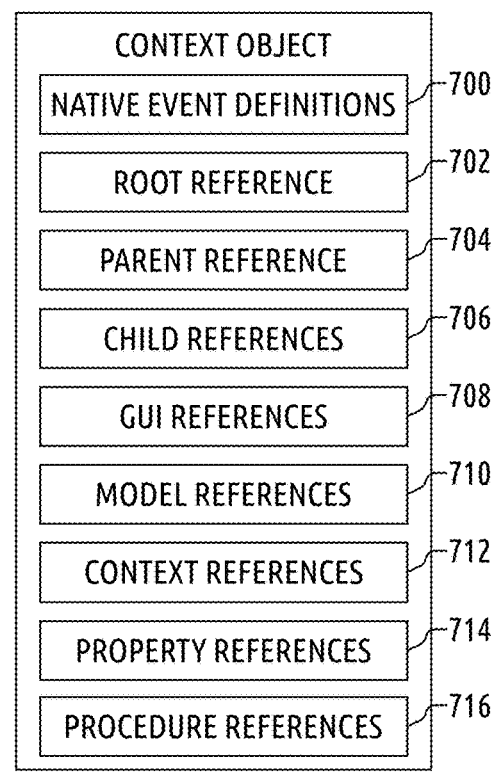
FIG. 7 is an example block diagram showing components of a context object.

A context object may hold references to other application objects, procedure definitions, and arbitrary properties. Context objects may allow for relationships to be created between objects. GUI objects and model objects may also hold these type of references, but a context object may be special in that this may be the only function that it serves. FIG. 7 shows components of a context object. A context object may include a number of native event procedure definitions 700. For instance, there may be a "late initialization" event procedure definition that creates a reference to a new context object at the end of a context object generation procedure. A context object may also contain references to other context objects that may create relationships between objects. These types of references may comprise: a root context object reference 702, a parent context object reference 704, child context object references 706, and references to previous and next sibling context objects. Additionally, a context object may also include ad hoc object references. These types of references may comprise references to: GUI objects 708, model objects 710, other context objects 712, arbitrary property references 714, and procedure definition references 716.

A context object definition may describe a context object as described above. Context object definitions may comprise the general application object definition properties described above. Due to the simple nature and purpose of context objects, a context object definition may often not be required. Several special types of context objects may be generated during the execution of an application.

Figure 8:
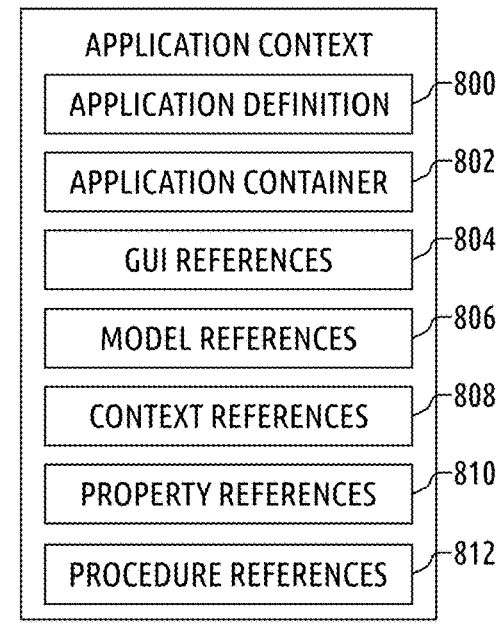
FIG. 8 is an example block diagram showing components of an application context object.

An application context object may be created during initialization of an application or sub-application. An application context object may be used as a medium for sharing special application properties, application object references, and data throughout an application. This may be facilitated by allowing an application context to be easily referenced by a find object module. The find object module 222, shown in FIG. 2, will be described below in the section with that heading. FIG. 8 shows components of an application context object. Special application properties included in an application context object may comprise: a reference to an application definition 800, and an application container 802. An application context object may also include ad hoc object references. Ad hoc object references may comprise references to: GUI objects 804, model objects 806, other context objects 808, arbitrary property references 810, and procedure definition references 812.

An event context may be created when an event is triggered or by the execution of special procedures. An event context may be used as a medium for sharing application object references and data between the actions of a procedure and nested procedures. This sharing may be facilitated by allowing an application context to be easily referenced by a find object module. The find object module 222, shown in FIG. 2, will be described below in the section with that heading.

Procedure Execution Module—FIGS. 1A, and 2

During the execution of the application 100A, the application interpreter module 104A may use a procedure execution module 218 to execute procedures defined in the application definition 102A. This process may generate the behavior of the application 100A. The term behavior is used to describe the ways an application interacts with users during its runtime. For instance, a word processor application may display a tool bar menu consisting of a number options. When a tool bar menu option is clicked, a sub-menu may appear below the tool bar menu option.

A procedure may be described by a procedure definition. Procedure definitions may be associated with application events, application object events, event templates, custom event definitions, action definitions, or may be generated during the execution of an application. A procedure may be executed in response to an application event or as a consequence of the execution of another procedure.

A procedure may be executed in response to an event that it is associated with. An event is something that happens during the execution of an application that the application may respond to. Types of events implemented by the application interpreter module 104A may comprise native application interpreter module events and delegated platform API events. A native event may be triggered when it is encountered during the execution of the application interpreter module 104A. Many types of native events may be made available by the application interpreter module 104A. Examples of this type of event may include an "application initialization" event, a "late GUI object initialization" event, and a "fill form" event. Delegated events may be triggered by the platform API 106A. Examples of delegated events may include a "mouse click" event, "text input change" event, and "mouse hover" event. Delegated events may be registered by the application interpreter module 104A using the platform API 106A.

A procedure definition may describe a procedure as the execution of a series of predefined procedures defined in an actions store 220. These predefined procedures may be called actions. An action definition may specify an action defined in the actions store 220 and may contain parameters that modify the execution of an action using property/value fields that may be easily described by known data description languages like JSON and WL. A procedure definition may comprise an ordered list of action definitions.

Action Store—FIG. 2

The actions store 220 may comprise a number of predefined procedures written in code suitable for the platform API 106A. Example actions and action types may include the following. A "dummy" action may do nothing, but may be useful for debugging purposes. Sub-application actions may generate or interact with sub-applications. Procedure actions may use the process procedure execution module 218 to execute procedures. Primitive actions may implement the functionality of a general purpose programming language. Examples of primitive actions may include: mathematical actions that perform mathematical functions on values found in properties and models, string manipulation functions that alter strings found in properties and models, comparison actions that compare values found in properties and models, flow-control actions that execute procedures based on values found in properties and models, and iteration actions that perform the same set of actions on a group of objects or properties. Application object actions may manipulate application objects. Examples of application object actions may include: creating and destroying objects, creating object references, manipulating object properties, and triggering object events. Platform API actions may interface with special aspects of a platform API. Examples of platform API action may include: registering delegated event procedures, setting timers, and logging to a browser console. Special-purpose actions may implement special functionality that might be slow or difficult to implement using a series of actions. Examples of special-purpose actions may include animation, drag-and-drop, and user management actions. Third-party-library actions may interface with third party library APIs. For instance, third-party-library actions may perform functions such as creating and manipulating a Google map in a web application.

Figure 9:
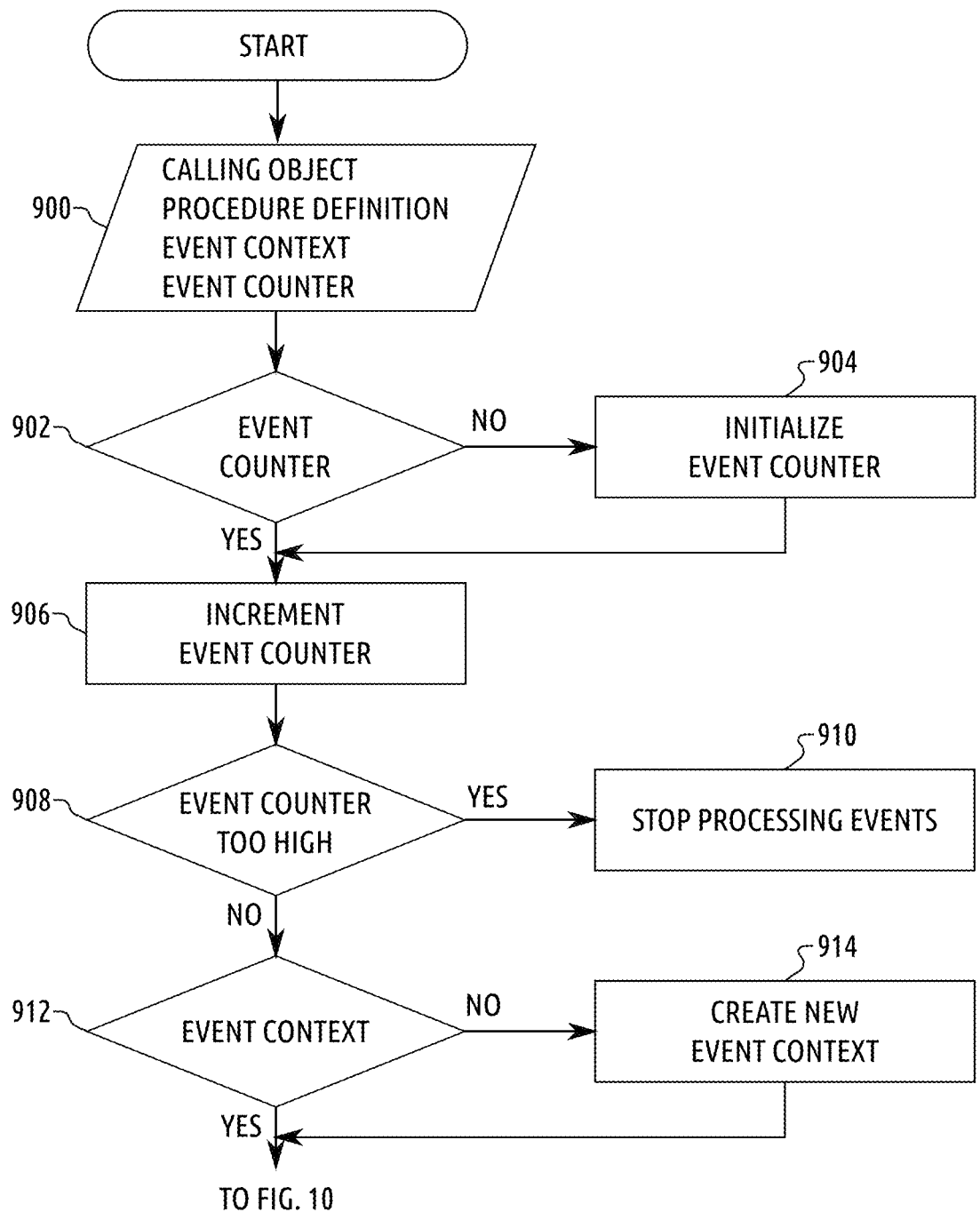
FIGS. 9 and 10 comprise an example flow chart showing a process procedure module procedure.
Figure 10:
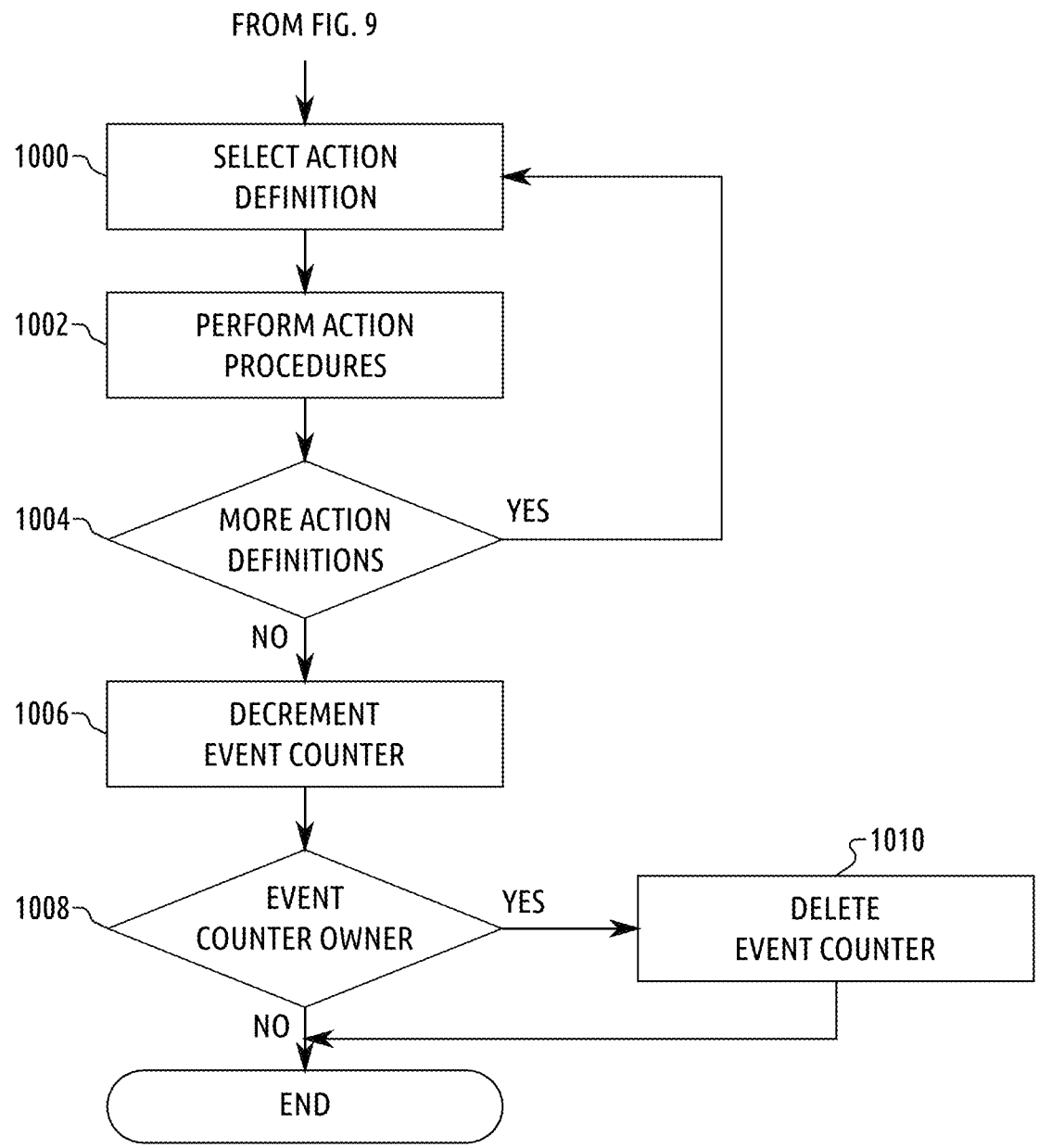

Process Procedure Module—FIGS. 9-10

The procedure execution module 216 may use a process procedure module 218 to execute actions as defined in a procedure definition. FIGS. 9-10 comprise an example flow chart showing a process procedure module procedure. In this embodiment, the procedure may first be configured to accept a calling application object, a procedure definition, an event context, and an event counter 900. If an event counter has not already been initialized 902, then an event counter may be initialized 904. Next, the nested event counter may be incremented 906 and tested against a predefined maximum nested event count 908. If the nested event count is too high, the procedure may be ended 910. Elements 902-910 may be used to prevent an application from crashing due to an infinite loop. The potential to encounter an infinite loop is introduced here because nested procedure definitions may be processed due to the calling of an action. For example, an action may use a GUI object definition to generate a new GUI object. When this GUI object is initialized, an event procedure definition may be executed. If the event procedure definition contains an action definition that uses the same GUI object definition to initialize another GUI object, that GUI object would then trigger the same event again, thereby creating an infinite loop.

Next, the procedure may test if an event context has been initialized 912. If not, a new event context may be initialized 914. An event context may be used to share the results of an action with other actions. Because an event context may be passed to a process procedure module, an event context may be shared by many different procedures executed due to the same event. Also, an application interpreter module may set properties of a process that triggered an event on an event context. This may be particularly useful for handling some delegated events.

Next, the procedure may select a first action definition 1000 and perform the procedures described by the action definition by executing an action procedure. When the action is executed it may be passed a number of parameters defined in the action definition, the event context, and a reference to the application object that initiated the event. The parameters of an action may include application object reference definitions. An action may use a find object module 222 to find references to objects that are needed to perform its function. An embodiment of a find object module is described below. An action may also use an event context to share its results with other actions. For example, a "compare" action may be used to check if the value of a property has been set. The "compare" action may create a reference to the result of the comparison in an event context. Then, a "conditional procedure" action may reference the result of the "compare" action in the event context and determine what event should be processed next.

An action may also cause other procedures to be executed. This may happen for a number of reasons. The purpose of an action may be to process other procedure definitions. For instance, a "conditional" action may cause different procedure definitions to be executed based on the value of a property. This may introduce a type of flow control to the process procedure module. An action may also trigger an event. For instance a "fill form" action may trigger a "fill form" event of a GUI object. An action may also indirectly trigger a native event during its execution. For instance, an "initialize GUI object" action may trigger a "late GUI object initialization" event. If the GUI object is a container with deeply nested children, it is possible that quite a few events of this type will be triggered and executed before the action is completed. An action may also register other event procedure definitions to be called in response to platform events. For instance, a "drag-and-drop" action may register an event to occur when a mouse button is released.

After an action has been executed, the process procedure module procedure may continue by testing if the procedure definition contains more action definitions. Elements 1000-1004 may be repeated until all action definitions have be processed.

After all action definitions have been processed, the nested event counter may be decremented 1006. Next, the procedure may check if the nested event counter was initialized by the current execution of the process procedure module procedure 1008. If so, the nested event counter may be deleted 1010, so that a new event counter may be initialized when the next procedure definition is processed.

Figure 11:
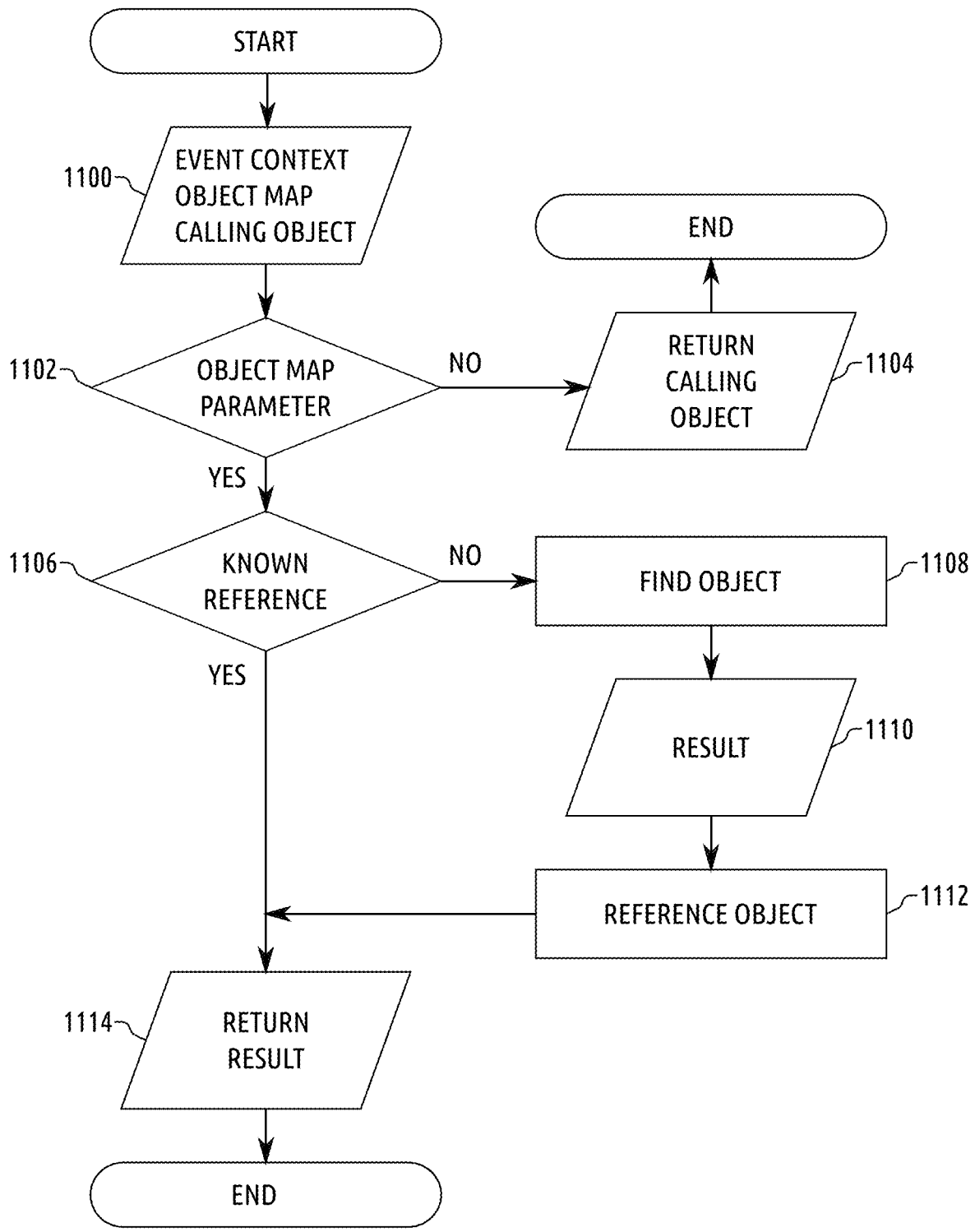
FIG. 11 is an example flow chart showing a find object procedure.

Find Object Module—FIG. 11

The find object module 222 may be used to reference objects and properties. FIG. 11 is an example flow chart showing a find object procedure. In this embodiment, this find object procedure may recursively process object reference definitions to perform its function. An object reference definition may comprise an object reference type, object reference name, and nested object reference definition. An object reference definition is like a map. It may describe a series of steps to find an object, starting at a known point. Because of this, object reference definitions are also referred to as object maps below.

In this embodiment, an iteration of an object reference procedure may be configured to accept an object reference definition (object map), a reference to an object that initiated the find object module procedure (calling object), and an event context 1100. Next, the procedure may test if an object map parameter was passed into the procedure 1102. If not, the procedure may return the calling object as its result 1104. Otherwise, the procedure may process the object map based on its type. The procedure may proceed by testing if the reference type is a known reference 1106. Three common known points may be: a calling object, an application context, and an event context. If the reference type is a known reference, the procedure may return the reference as its result 1114.

If the object reference type is not a known reference, another nested iteration of the find object procedure may be called 1108. This time, the nested object reference definition property of the current object reference definition may be used as the object map parameter. The calling object and event context parameters may remain the same. This process may continue until a known reference is found or an error is encountered. The nested iteration of the find object procedure may return an object, other value, or undefined result 1110. Next, a property of the returned object may be referenced based on the object reference type and name properties of the object map 1112. Finally, the procedure may return the value of the referenced property as its result 1114. If no value was found, or an error was encountered, the procedure may return an undefined result.

For example, an action may need to find a model object named "form" referenced in a parent application object of a calling application object. In this case, an object reference definition may consist of one nested object reference definition and require three iterations of the find object procedures described above. The first iteration will call a second iteration, and the second iteration will call a third iteration. The third iteration will find no object reference definition and return the calling application object to the second iteration. The second iteration will return the parent of this object to the first iteration. Finally, the first iteration will return a model referenced in this object by the name "form" to the action.

Object Template Definitions—FIG. 2

The simple property/value structure of an application definition may allow the structure to be defined and manipulated in interesting ways. One way to take advantage of this may be to use object template definitions. An object template definition may have the same structure as a basic object definition type that it is related to. Object template definitions used by an the application 100A may be stored in an object template definitions section 204 of the application definition 102A. Commonly used object template definitions may be stored in an object template definitions section of the application interpreter module 104A. Object templates may be used to speed application definition building, simplify the description of application objects, decrease the size of an application definition, and allow for multiple versions of an application to be generated from a single application definition. Several different types of template definitions are described below.

Procedure templates are procedure definitions that may be called by a process procedure template action. They act like functions in that they may be called from multiple points in an application, and may accept parameters as object reference definitions. Each time a procedure template is called by a process procedure action, the actions of the procedure template may be executed in a new environment, and the actions of the procedure template may encounter different variables and produce different results.

For example, a procedure template may be created that prepends the string "hello" to a string found in an event context. This simple procedure template may consist of a single concatenate string action. It may be used by an event procedure that is fired when text is entered into a text box. This event procedure may retrieve the text from the text box and place a reference to it in the event context. The event procedure may then call the procedure template described above using a process procedure template action. After this, the text box event may continue to create a dialog containing the new string.

Object definitions may also be considered to be object template definitions in that they may be used to create many different objects within the same application. An object definition used like this may be called a clone template. For instance, a GUI object definition that describes a branding icon may be reused by referencing it where ever it is needed. Container GUI objects may also be reused in this manner. For instance, a GUI object definition that describes a table row GUI object that contains a number of table cell GUI objects may be reused by referencing its GUI object definition repeatedly to build a table.

Basing templates may allow for multiple versions of an application to be generated from a single application definition. A basing template definition may contain a collection of object definitions that parallel object definitions of an application definition. An object definition within a basing template definition may contain alternative properties to be used in a different distribution of an application. A distribution definition may request that any number of basing templates be applied to the object definitions of an application definition before the application definition is deployed. When a basing template is applied to an application definition, the properties of each object definition defined in the basing template may replace the properties of the object definition that it parallels.

One use of basing templates is to allow a single application definition to generate applications in many different languages. For instance, an application definition may include GUI object definitions with English language text. When this application definition is deployed without first applying a basing template, the resulting application will display English language text. The same application could also be deployed with Spanish language text if it also includes a basing template containing Spanish language text. When the basing template containing the Spanish language text is applied to the application definition, the English language text will be replaced with the Spanish language text of the basing template.

Extension templates may be merged with properties defined in an object definition to add properties to an object definition or augment properties, like event procedure definitions, that are a list of values. Object and action definitions may include references to any number of extension templates, and extension templates may also contain references to other extension templates. References may allow for extension templates to be combined and altered to create objects and actions with different properties. For instance, a container GUI object template may comprise a native late initialization event procedure definition containing an initialize container action. If the object definition already contains a late initialization event procedure definition, the initialize container action may be merged with the other actions in the procedure. If the object definition does not already contain a late initialization event procedure definition, one may be created.

Extension templates may be used to simplify the process of building an application for a developer. For example, many different GUI object definitions can generate GUI objects with similar properties by applying the same GUI object extension template to them. If the properties of the GUI object extension template are modified, the properties of GUI objects generated by GUI object definitions referencing this GUI object extension template may also be modified.

Extension templates may also allow a developer to view objects as being of certain types. For instance, a GUI object that displays a button using a delegated on-click event procedure definition that causes an application preview to be created may be viewed as a preview button if a preview button GUI object extension template is made available. However, the use of this template may not limit a developer's ability to modify properties of a GUI object definition. For instance, after a reference to the preview button extension template is added to a GUI object definition, an action may be added to the GUI object definition's on-click event that also causes a dialogue to be shown.

Object definition copies may also be created, stored, and used to build an application definition. Though any type of object definition may be copied and saved, copies of container GUI object definitions may be interesting. A copy of a container GUI object definition may be called a container copy. A container copy may define a GUI component of great complexity.

A container copy configured to perform a function of an application may be called a widget. When a widget is inserted into an application definition, it may be called an application component. Several examples of application components will be provided below in a section describing how the different object types work together during an application runtime.

Object definition copies can make building an application definition much easier. An inexperienced developer may choose to build an application definition using widgets provided by another developer. These widgets may require little or no modification. If the required widgets are available, the process of building an application would be similar to making a collage. Intermediate developers may customize the object definitions of an object copy that has been added to an application definition. They may also create their own widgets based on other widgets, combinations of widgets or from scratch.

A special type of application definition may be created to store any number of template definitions and object definition copies. Such an application definition may be called a resource definition or resource. Templates and object definition copies included in a resource may be made available in another application definition or resource by copying the contents of one into the other, or by referencing an external resource definition. A resource that has been copied into another application or resource may be referred to as an included resource. A resource that is referenced by another resource may be referred to as an external dependency. A resource may comprise any number of template definitions and object definition copies, and may also include any number of other resources or resource references. A resource may include template definitions and object definition copies that make use of the template definitions and object definition copies of other resources. A resource that provides a large number of templates and object definition copies may be called a library.

A system for providing and managing resources may be created. Such a system may: provide a method to save and modify application, service, and resource definitions, and allow resource definitions to be used by application definitions, service definitions, and other resource definitions. A resource management system may also facilitate the use of resources by providing special tools. For instance, tools may be provided that ensure that once resource object definitions have been included in an application, service, or resource definition, they will not be included again.

Application definition templates may also be created. An application definition template may simply be an application definition that has already been started. An application definition template may include any number of object definitions, object definition copies, template object definitions, included resources, and external dependency references. These types of templates may be easy to create because an application definition may be copied by simply duplicating a database record or in-memory object.

Figure 12:
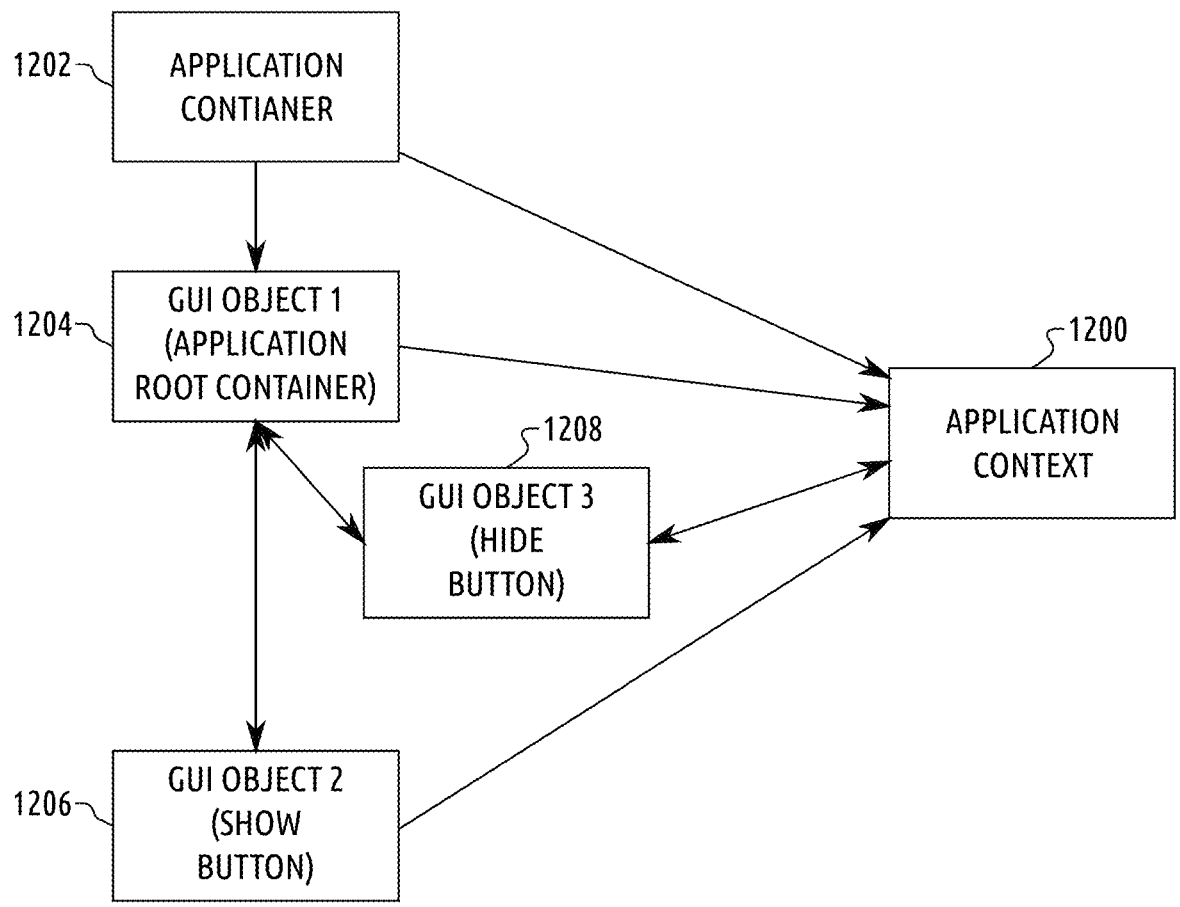
FIG. 12 is an example block diagram showing objects generated during an application initialization procedure. An embodiment of an application definition that may generate this configuration is provided below.
Figure 13A:
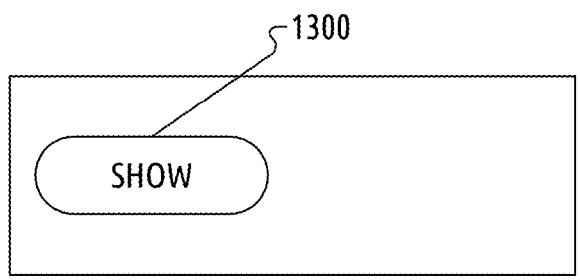
FIG. 13A is an example illustration of a GUI representation generated by an application definition provided below.
Figure 13B:
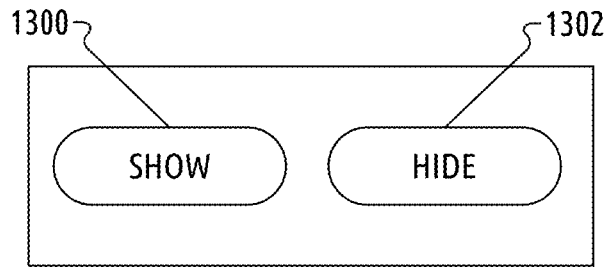
FIG. 13B is an example illustration of a GUI representation of the application displayed in FIG. 13A after the button labeled "Show" has been clicked.

Application Definition Generation—FIGS. 12, 13A, and 13B

The simple property/value structure of an application definition allows them to be created by a number of methods. Methods for creating application definitions may comprise writing a text document using a text editing application, using a special development interface application, and using automated procedures.

One straightforward method of building an application definition is writing a text document conforming to specifications of an application interpreter module. An embodiment of a very simple and human readable application definition is shown below. Several fields not mentioned before have been added to this application definition. Descriptive fields that are not required by an application interpreter ("Name", "Description", "Notes", "Todo", etc.) may be added to any object definition to help a developer search for and understand the purpose of an object definition. Fields like this may be called metadata fields.

```
{
    "Application ID" : 1,
    "Name"           : "Hand Written Application",
    "Description"    : "An application definition written by hand.",
    "Root GUI object Definition Reference" : "GUI Object Definition 1",
    "Application Events" : {
        "Initialization Event" : [
            {
                "Action Type"      : "Initialize Base GUI Object",
                "GUI Object Definition Reference" : "GUI object
                Definition 1",
                "Root GUI Object Reference Name" : "main"
            }
        ]
    },
    "GUI Object Definitions" : {
        "GUI Object Definition 1" : {
            "Name"        : "Application Root Container",
            "Description" : "The root GUI object definition.",
            "GUI Object Extension Templates" : [
                "Main Application Container"
            ],
            "Class Definitions" : [
                "Main Application Container"
            ],
            "Native Events" :
            {
                "GUI Object Initialization" : [
                    {
                        "Action Type" : "Initialize Container"
                    }
                ]
            },
            "Child GUI Objects" : [
                "GUI Object Definition 2",
```

-continued

```
                "GUI Object Definition 3"
            ]
    },
    "GUI Object Definition 2" : {
        "Name"        : "Show Button",
        "Description" : "This button shows the hide button."
        "Text"        : "Show",
        "Class Definitions" : [
                    "Button"
        ],
        "Delegated Events" : {
            "Click" : [
                {
                    "Action Type" : "Show GUI object",
                    "Object Reference Definition" : {
                        "Object Reference Type" : "GUI object",
                        "Object Reference Name" : "Hide Button",
                        "Nested Object Reference Definition" : {
                            "Object Reference Type" : "Application Context"
                        }
                    }
                }
            ]
        }
    },
    "GUI Object Definition 3" : {
        "Name"        : "Hide Button",
        "Description" : "This button hides itself."
        "Text"        : "Hide",
        "Class Definitions" : [
                    "Button"
        ],
        "Native Events" : {
            "GUI Object Initialization" : [
                {
                    "Action Type"      : "Set GUI Object Reference",
                    "Reference Property" : "Hide Button",
                    "Object Reference Definition" : {
                        "Object Reference Type" : "Application Context"
                    }
                },
                {
                    "Action Type" : "Hide GUI Object"
                }
            ]
        },
        "Delegated Events" : {
            "Click" : [
                {
                    "Action Type" : "Hide GUI Object"
                }
            ]
        }
    }
}
```

When executed, an application initialization procedure may generate an application context 1200, an application container 1202, and three GUI objects, as defined in the application definition. FIG. 12 is an example block diagram showing the generated objects and relationships between them. The application initialization event procedure may generate a first GUI object 1204 using "GUI Object Definition 1", by calling an "Initialize Base GUI object" action. Then, this GUI object may generate two GUI objects as child GUI objects by calling an "Initialize Container" action on itself. During initialization, the two child GUI objects may register delegated event procedures. Also, a GUI object generated using "GUI object Definition 3" 1208 may create a reference to itself in the application context 1200, on the property "Hide Button" by performing a "Set GUI object Reference" action. The GUI object 1208 may also cause the GUI element that it is associated with to be hidden in a GUI by performing a "Hide GUI Object" action on itself. FIG. 13A is an illustration of an initial GUI configuration generated by executing this application definition as described above.

After initialization, this application may:

1) Respond to mouse clicks on a GUI element represented by a GUI object generated using "GUI object Definition 2" 1206, by performing a "Show GUI object" action on the GUI object referenced as "Hide Button" 1208 on the application context 1200. This may cause a GUI element associated with the GUI object 1208 to be shown in the GUI. FIG. 13B is an illustration of a GUI configuration created by executing this event procedure.

2) Respond to mouse clicks on the GUI element represented by the GUI object generated using "GUI object Definition 3" 1208, by performing a "Hide GUI object"

action on itself. This may cause the GUI element associated with this GUI object 1208 to be hidden in a GUI. FIG. 13A is an illustration of a GUI configuration created by executing this event procedure this event procedure.

Writing application definitions by hand is an awkward and tedious task that can be made much easier by a well designed application. An application that builds application and service definitions may be called a development interface. A development interface may provide a developer with a variety of tools to aid in the construction of application, service and resource definitions. A discussion of embodiments of a development interface is provided in a later section.

Automated procedures may be used to generate application definitions, application components, and application resource definitions. There are a number of ways that this can be useful.

One straightforward method of automatically generating an application definition is to copy an application definition. This new application definition may then be edited independently of the original. Application definition templates may be implemented this way.

An application definition may also be generated by modifying an application definition in a predefined way and saving the result. This may be particularly useful when deploying an application. For instance, before an application definition is deployed, any number of basing templates may be applied to it. Also, as was mentioned above, it may be useful to add metadata fields to an application definition to facilitate a development process. Procedures may be provided to remove metadata properties and other unneeded object definitions and properties from an application definition before it is deployed.

Application resource definitions may be identical to application definitions. Procedures that automatically generate application resource definitions may facilitate sharing of application definition objects between application definitions. A development interface may implement event procedures that generate a new resource definition from a portion of an application definition. This procedure may involve creating a resource definition containing a large number of object definitions. For example, an application component may reference procedure templates. A procedure designed to create a resource from this application component may need to include the referenced procedure template definitions in the generated resource definition.

A development interface may also implement procedures to generate application components. An example of this is the ability to copy and paste container copies. More interesting and involved procedures may also be implemented. For example, a form used to edit database records may be automatically generated based on the fields of a service definition.

Application Component Examples

To understand how aspects of an application runtime environment are generated from an application definition, and how they work together, it may be helpful to view an application as a collection of application components. An application component may comprise any number of application objects configured to work together to perform a function of an application. Relationships between objects in an application component may be created using contexts. Each application component context may be made to be directly available only to the objects of the application component.

Figure 14:
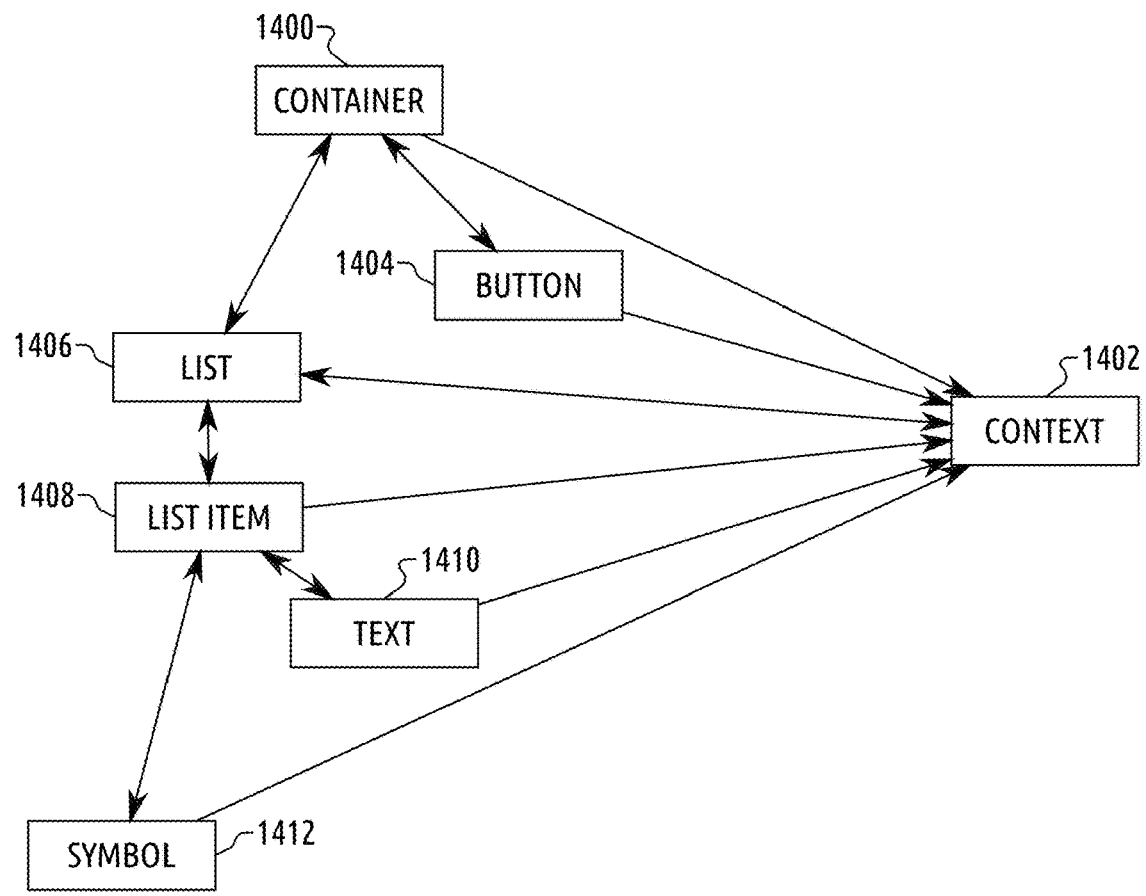
FIG. 14 is an example block diagram showing a reveal menu component.
Figure 15A:
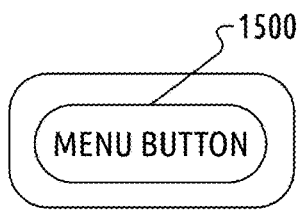
FIG. 15A is an example illustration of a GUI representation of a reveal menu component with a reveal list hidden.
Figure 15B:
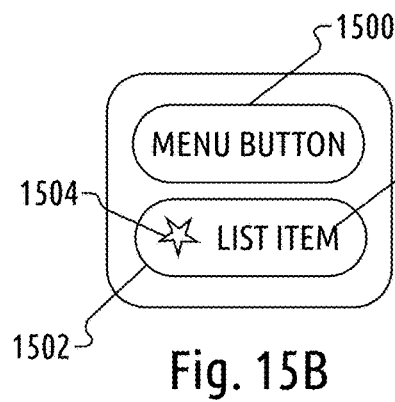
FIG. 15B is an example illustration of a GUI representation of a reveal menu component with a reveal list shown.
Figure 16:
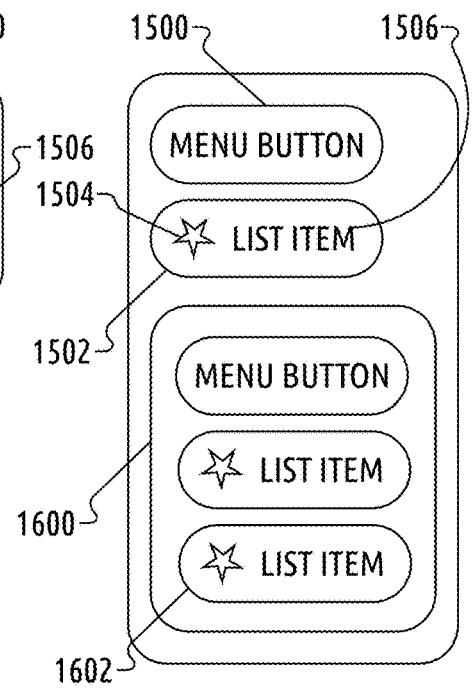
FIG. 16 is an example illustration of a GUI representation of nested reveal menu lists.

Application Component Example—Reveal Menu—FIGS. 14-16

An example of an application component may be a menu button configured to hide and show a list of options when clicked. This type of application component may be called a reveal menu. FIG. 14 is an example block diagram showing application objects configured to implement a reveal menu and relationships between them. FIG. 15A shows an example illustration of a reveal menu with the list not shown. FIG. 15B shows an example illustration of a reveal menu with the list shown. A container GUI object 1400 may help group other GUI objects and facilitate sharing of the context object 1402. A "button" GUI object 1404 may be associated with a button GUI element 1500. A "list" GUI object 1406 may be associated with a list GUI element and is not labeled in FIG. 15B because it would be difficult to distinguish from GUI elements nested inside of it. The "list" GUI object 1406 may be the only application object referenced by the context object 1402 and includes a child "list item" GUI object 1408. The "list item" GUI object may be associated with a GUI element 1502 and contains two child GUI objects: a text GUI object 1410 that is associated with a GUI element 1506 and a symbol GUI object 1412 that is associated with a GUI element 1504.

GUI object definitions may be configured to generate a reveal menu component. First, a GUI object definition may be configured to generate the base menu container GUI object 1400. When initialized, this object may also create the context object 1402 and a reference to this context object on its own property named "menu". The "menu" context 1402 may be a regular context object that may be used to facilitate creation of the menu component. GUI objects generated by the base menu container 1400 and their children may inherit a reference to the menu context 1402.

Next, the "container" 1400 may generate the "button" GUI object 1404. A "button" GUI object definition may be configured to register a delegated "mouse click" event procedure. When the GUI element 1500 associated with the "button" GUI object 1404 is clicked, this procedure may find the "list" GUI object 1406 in the context 1402, determine whether the list is currently shown or hidden, and then modify the GUI element associated with the "list" GUI object 1406 to either be shown or hidden based on it's current state.

Next, the container 1400 may generate the "list" GUI object 1406. A "list" GUI object definition may be configured to create a reference to the new object definition 1406 in the "menu" context 1402 and generate the "list item" GUI object 1408. A "list item" GUI object definition may be configured to generate the child GUI objects 1410 and 1412. Additionally, the "list item" GUI object definition may specify delegated event procedures to be registered. For instance, when the GUI element 1502 associated with the "list item" GUI object 1408 is clicked, it may open a special dialogue and then hide the GUI element associated with the "list" GUI object 1406 by referencing it in the context 1402.

Relationships may be created between application components, like reveal menu components, to create composite application components. FIG. 16 shows an example illustration of the same reveal menu shown in FIGS. 14, 15A, and 15B with another similar reveal menu 1600 nested inside of it. The nested reveal menu 1600 may be configured so that when a list item is clicked, both reveal menus will collapse. This configuration may represent a composite application component that may be called a collapsing reveal list. The nested reveal list 1600 contains all of the features of the reveal menu described in FIGS. 14, 15A, and 15B plus a few additions. In addition to the extra "list item" GUI element 1602, the nested "menu" context associated with the nested reveal menu component includes a parent reference to the "menu" context 1402. This reference may be used by a delegated "mouse click" event procedure, associated with the "list item" GUI element 1602, to hide the GUI element associated with the "list" GUI object 1406.

Figure 17:
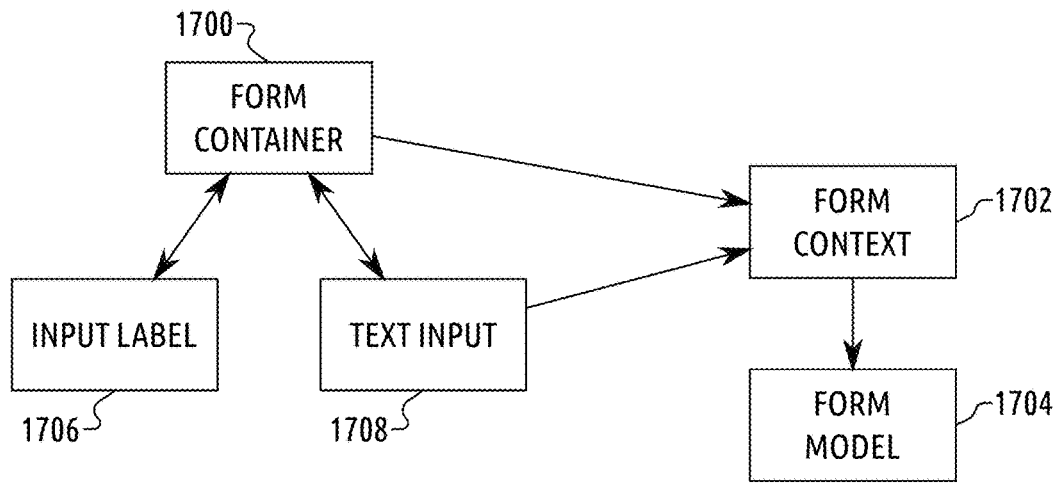
FIG. 17 is an example block diagram showing a form component.

Application Component Example—Form—FIG. 17

Another example of an application component may be a form component. A form component may be used to collect, modify and display data using a model. FIG. 17 is an example block diagram showing application objects configured to implement a form component and relationships between the objects. A container GUI object 1700 may help group other GUI objects, facilitate sharing of the context object 1702, and provide events and procedures that facilitate updating form inputs. The context object 1702 references a model object 1704. The model object 1704 may be a remote record model and may be used to persist data to a database. An "input label" GUI object 1706 may be associated with a label GUI element. The object 1706 may contain text describing the purpose of a "text input" GUI element 1708. This text may be something like, "Please enter your email address." The "text input" GUI object 1708 may be associated with a text input GUI element. The "text input" GUI object 1708 may be used to collect data like an email address and may contain properties and event definitions that define the ways this input should interact with the model object 1704.

Although the form component represented in FIG. 17 is very simple, it presents the opportunity to discuss a few interesting techniques. This configuration may allow a form component to quickly and easily display and manipulate many different database records if these records conform to a schema. This may be accomplished by simply changing the "form" context object 1702 model reference 1704. This may change a data source that the "text input" 1708 will interact with. This may work the same way for a form component containing many inputs. A "fill form" event may also be called on the form container 1700 after a model reference is changed. The form component may be configured so that the event may cause all inputs to be updated to represent data contained in a model currently associated with the "form" context.

Figure 18:
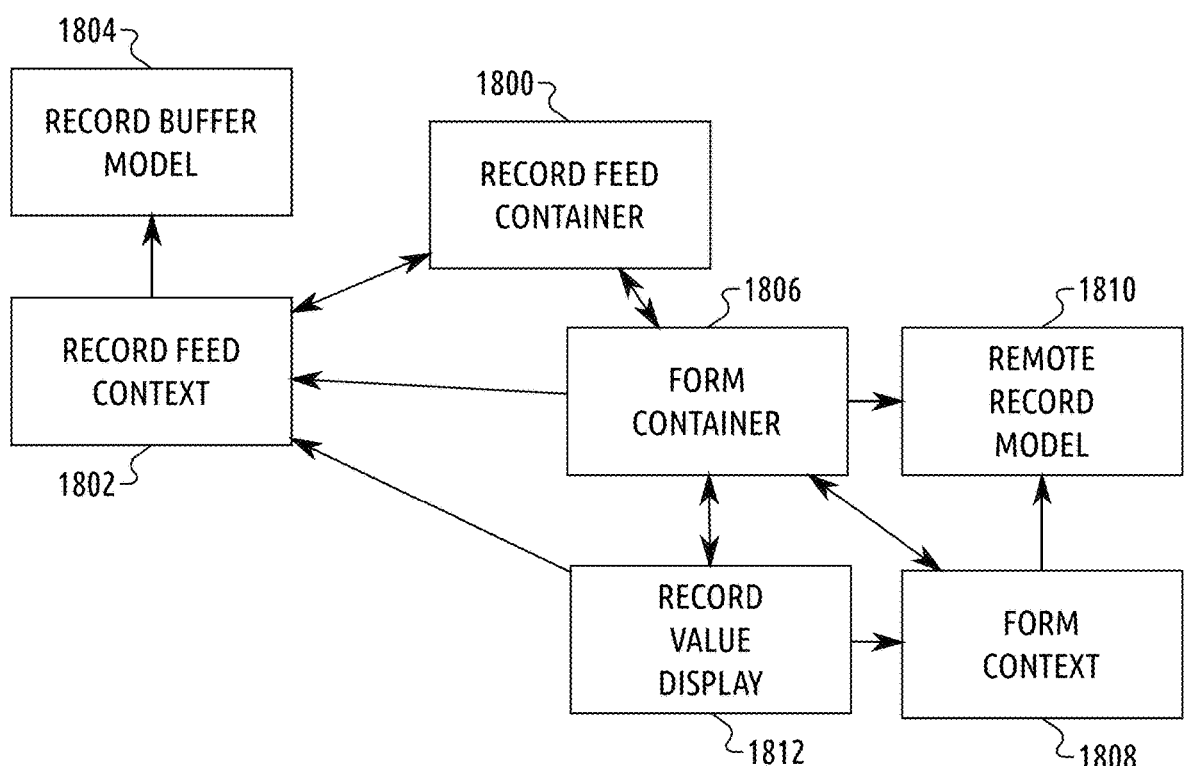
FIG. 18 is an example block diagram showing a document feed component.

Application Component Example—Record Feed—FIG. 18

Another example of an application component may be a record feed component. A record feed component may display data provided by a remote record buffer model. This may be accomplished by generating a number of form components within a record feed container. FIG. 18 is an example block diagram showing application objects configured to implement a record feed component and relationships between them. This configuration may generate a list or table of values obtained from a data source. A "record feed" container GUI object 1800 may help group child GUI objects, facilitate sharing of a "record feed" context object 1802, and provide events and procedures that initialize and manage the record feed component. The "record feed" context object 1802 references a record buffer model object 1804. The "record feed" container 1800 may contain many form components similar to the form component embodiment shown in FIG. 17. Each form component may represent a database record retrieved by the record buffer model 1804. FIG. 18 only shows application objects configured to implement one form component. A "form" container GUI object 1806 may help group other form component GUI objects and facilitate sharing of a "form" context 1808. The context 1808 references a remote record model object 1810. The model object 1810 may have been retrieved from the record buffer model 1804. Finally, a "record value display" GUI object 1812 may be associated with a GUI element containing text. This text may represent data contained in the remote record model 1810.

Figure 19A:
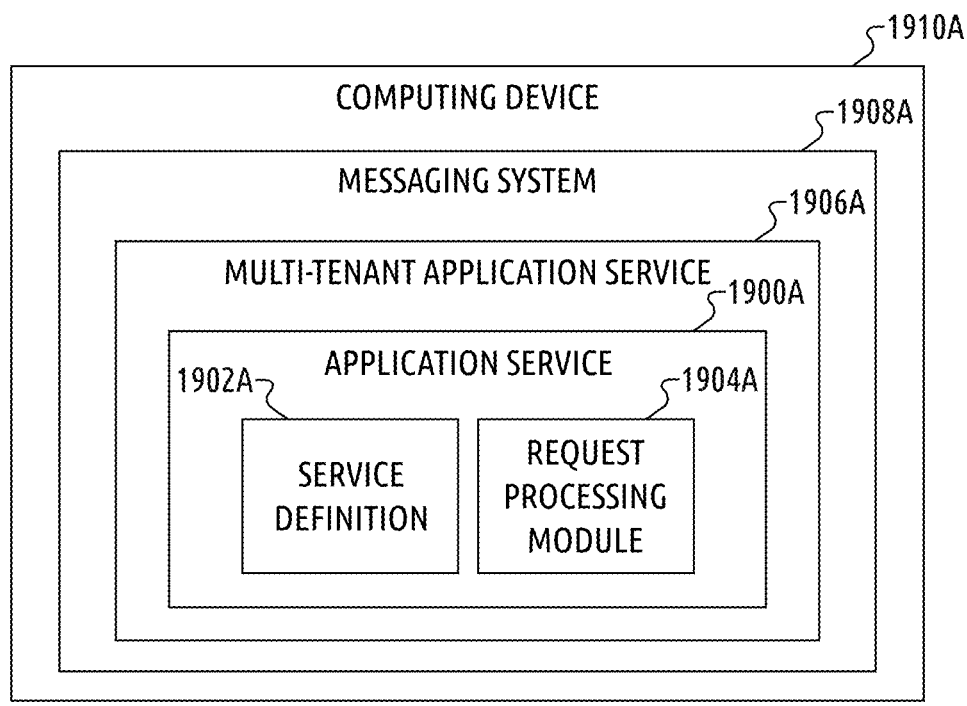
FIG. 19A is an example block diagram showing components of an application service.

Application Service—FIG. 19A

Embodiments of a system for describing an application service using property/value fields that may be easily described by known data description languages like JSON and XML, and stored in a database, and for providing a number of application services using a single multi-tenant application service are provided below.

FIG. 19A is a block diagram showing runtime modules of an application service 1900A generated using the methods described below. A service definition 1902A, a request processing module 1904A, a multi-tenant application service 1906A, and a messaging system 1908A may comprise runtime modules of the application service 1900A.

The application service 1900A may provide an application with capabilities not made available by a platform API, and respond to arbitrary requests. The application service 1900A may receive requests, retrieve and manipulate data in data stores, perform other custom functions based on request parameters, and send responses to requests. The application service 1900A may make requests on other services and external resources, or independently perform its functions. The application service 1900A may also be referred to herein as a service, tenant service, or API.

The service 1900A may be provided by making the service definition 1902A available to the request processing module 1904A. The service 1900A may be configured to generate a response to requests received by the messaging system 1906A. When the messaging system 1908A receives a request, the multi-tenant application service 1906A may be configured to use the application service 1900A to generate a response. The multi-tenant application service 1906A may do this by making the service definition 1902A available to the request processing module 1904A.

Service Definition—FIG. 19A

The service 1900A may be described by the service definition 1902A. The service definition 1902A may describe ways that access to the tenant service 1900A may be authorized, and ways that it may respond to requests. The service definition 1902A may describe an API. Aspects of the service 1900A may be described using property/value fields that may be easily described by known data description languages like JSON and WL, and stored in a database. The syntax and fields of the service definition 1902A may conform to specifications of the request processing module 1904A.

Aspects of the service definition 1902A may be hierarchical in nature. For instance, the service definition 1902A may contain a number of field definitions. A field definition may contain a number of event procedure definitions or references to procedure definitions. An event procedure definition may contain a number of action definitions or references to action definitions and so on. The nature of various aspects of the service definition 1902A will be described below in relationship to aspects of the request processing module 1904A to which they relate.

Figure 20:
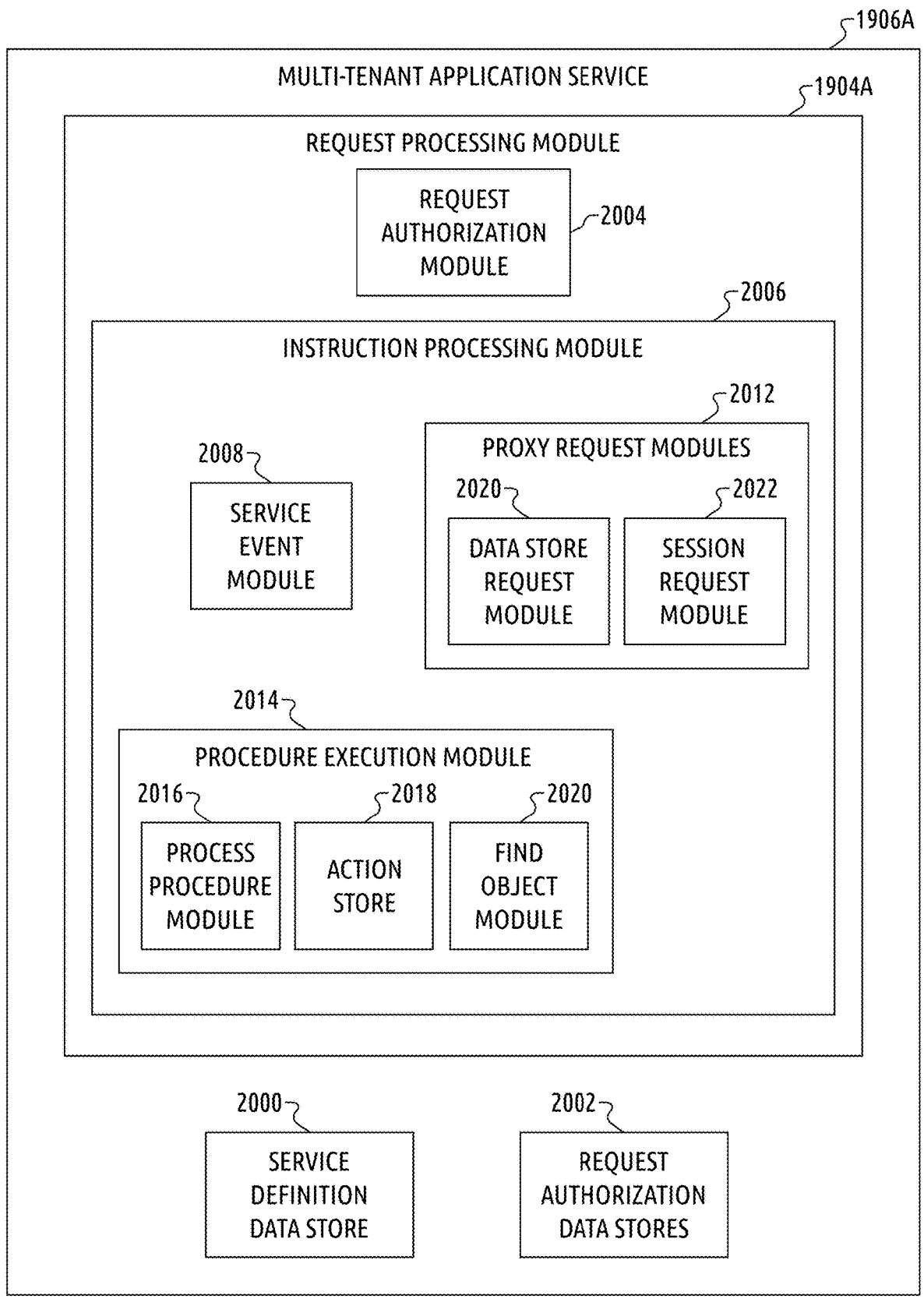
FIG. 20 is an example detailed block diagram showing components of an application service.

Multi-Tenant Application Service—FIGS. 19A, and 20

The multi-tenant application service 1906A may allow a single program and network address to provide any number of different tenant services. The multi-tenant application service 1906A may send and receive requests by interacting with the messaging system 1908A. The messaging system 1908A may be a process, or number of processes that may provide methods to interact with a computing device 1910A and communicate with other applications or networked computing devices. Example messaging systems may include a network server connected to the Internet, or a computer running a general purpose operating system like Linux.

FIG. 20 shows components of the multi-tenant application service 1904A. Components of this module may comprise: the request processing module 1904A, a service definition data store 2000, and a number of authorization data stores 2002. The request processing module 1904A may be implemented as a process or number of processes executing on the computing device 1910A. The service definition data store 2000 and authorization data stores 2002 may be implemented by database servers.

The service definition data store 2000 may contain the service definition 1902A. The multi-tenant application service 1906A may retrieve this service definition by making a request to this data store. Then, it may provide the tenant service 1900A by making the service definition 1902A available to the request processing module 1904A. The service definition data store 2000 may contain any number of other service definitions. Each of these service definitions may be used to provide a different tenant service.

Figure 21:
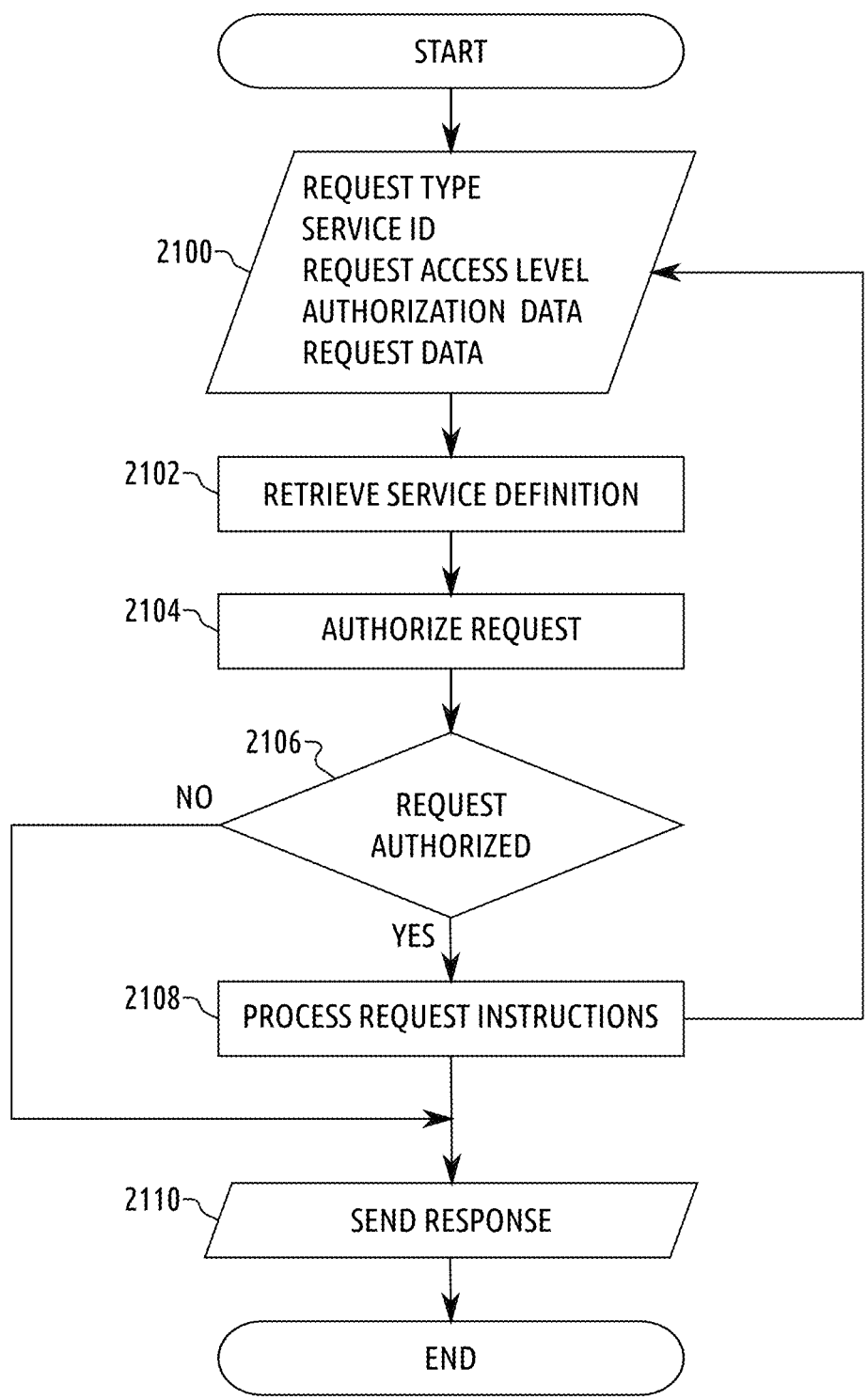
FIG. 21 is an example flow chart showing an application service request processing procedure.

Request Processing Module—FIGS. 20, and 21

When the messaging system 1908A receives a request, the multi-tenant application service 1906A may be configured to use the request processing module 1904A to generate and return a response.

A request to a multi-tenant application service may include data needed to carry out a function of a service using property/value fields that may be easily described by known data description languages like JSON and XML. This data may comprise: a request type, a service ID, a request access level, authorization data, and other data related to a request. The nature of various aspects of a request will be described below in relationship to aspects of a request processing procedure to which they relate.

A response returned by a request processing module may describe a result of processing a request using property/value fields that may be easily described by known data description languages like JSON and XML. A response may include data retrieved from a data store, or data describing a result of a function of a service. A response may also be generated when an error is encountered. An error response may be generated if a request is not properly formed, or if a request is not authorized.

FIG. 21 shows an example request processing procedure. In this embodiment, the procedure may first receive a number of request parameters 2100. Next, the procedure may retrieve a service definition 2102. In this embodiment, retrieval may be accomplished by making a request to the service definition data store 2000. A request service ID parameter may be used to request the correct service definition. A service ID parameter may also be referred to as a service gateway herein. Next, the request may be authorized 2104 using a request authorization module 2000. If the request was not authorized 2106, an error response may be returned 2110. If the request has been authorized 2106, an instruction processing module 2000 may be used to process the request. The request may be processed according to request and service definition properties 2108. While request instructions are being processed 2108, requests may be made to other services. Finally, a response may be returned 2110. In some cases, a response may be returned before request instructions have completed, or not at all.

Request Authorization Module—FIGS. 19A, and 20

The request authorization module 2004 may be used to authorize a request made to the service 1900A. The request may include a requested access level parameter. This parameter may specify an access level defined by the service definition 1902A. The request authorization module 2004 may retrieve and use an access level definition associated with this access level to authorize and process the request. The service definition 1902A may also specify a default access level definition to be used when a request does not specify one.

An access level definition may describe authorization requirements, and permissions granted if its authorization requirements are met. The access level definition may do this using property/value fields that may be easily described by known data description languages like JSON and WL. An access level definition may be stored in an access level definitions section of a service definition. Authorization requirements may comprise: request origin properties, request owner properties, requested operation, and special operation specific properties. Properties may allow or disallow requests. For example, one property may allow requests from all HTTP origins, and another may cause requests from a list of HTTP origins to be rejected.

The multi-tenant application service 1906A may provide special tools to control access to tenant services. These tools may facilitate user authorization and collection of lists of authorization parameters. The request authorization module 2004 may include special request authorization services configured to interact with associated request authorization data stores 2002. These special tools may include user credential spaces, user sessions, and a number of special authorization groups.

A user credential space may define a special data store that may be used to safely store user credentials and retrieve them to authenticate requests. A user credential space definition may describe a user credential space. User credential space definitions may be stored in a user credential space definition data store. A user credential space may store user credential entries in a user credential entry data store. A single user credential entry data store may be used by all user credential spaces and may be used to authenticate request credentials. User credential entries may include a property indicating a user credential space they are associated with. This configuration may allow new credential spaces to be safely and easily created for new services. This configuration may also allow user spaces and credentials to be shared by many services.

A user session may define a special data store that may be used to store and manage user session tokens. A session definition may describe a user session. A session definition may define requirements that must be met before a session token is issued. For example, a session definition may define a credential space or credential spaces that may be used to authorize access to a session. Session definitions may be stored in a user session definition data store. A user session may store user session tokens in a user session token data store. A single user session data store may be used by all user sessions and may be used to authorize requests. User session token entires may include a property indicating a user session they are associated with. This configuration may allow new sessions to be safely and easily created for new services. This configuration may also allow user sessions and session tokens to be shared by many services.

A number of special authorization groups may be used to define lists of authorization parameters. Special authorization groups may comprise: user groups, service groups, session groups, credential space groups, HTTP origin groups, and HTTP referer groups. An authorization group may be referenced by a service, user session, or credential space access level to define conditions that may cause a request to be authorized or denied. An authorization group definition may describe an instance of an authorization group. Each authorization group definition type may be stored in a different data store. An authorization group may store authorization group entries in an authorization group entry data store. A single authorization group entry data store may be used by each authorization group type. Authorization group entries may include a property indicating an authorization group they are associated with. This configuration may allow groups of authorization parameters to be safely and easily created and shared. For instance, periodic subscriptions to a service may be managed using a subscriber user group. The subscription service may require a user to be a member of the subscriber user group. When a user's subscription begins, they may be added to the subscriber user group. When a user's subscription ends, they may be removed from the subscriber user group.

Instruction Processing Module—FIGS. 19A and 20

The instruction processing module 2006 may be used to perform operations to respond to a request made to the service 1900A. Operations performed by the instruction processing module 2006 may comprise: executing procedures, sending requests to other services, and generating a response to a request. Parameters that may effect operations performed by the instruction processing module 2006 may comprise: the service definition 1902A, an authorized access level definition, request parameters, and special proxy request data that may be associated with a request. The instruction processing module 2006 may comprise: a service event module 2008, a procedure execution module 2010, and a number of proxy request modules 2012.

Service Event Module—FIGS. 19A and 20

The service event module 2008 may be used to respond to a custom service event request. The service event request may comprise a service event name, and a number of service event parameters. The service event name may be used to retrieve a service event procedure definition defined in the service definition 1902A. This service event procedure definition may be similar to an application 100A event procedure definition stored in the application definition 102A described above. The service event module 2008 may then use a procedure execution module 2000 to execute actions as defined in the procedure definition and generate a response.

Procedure Execution Module—FIGS. 9, 10, and 20

The procedure execution module 2014 may be used to execute a procedure. The procedure execution module 2014 may be very similar to the application procedure execution module 216 shown in FIG. 2 and described above. A procedure may be executed in response to a service event, native request processing module event, or as a consequence of the execution of another procedure. Components of the procedure execution module 2014 may comprise: a process procedure module 2016, an action store 2018, and a find object module 2020.

The process procedure module 2016 may be used to execute actions as defined in a procedure definition. The process procedure module 2016 may be configured like the application 100A process procedure module 218 shown in FIG. 2, and implemented as shown in FIGS. 9-10.

The actions store 2018 may comprise a number of pre-defined procedures written in code suitable for the request processing module 1904A. Example actions and action types may include procedures that: generate a response, provide functionality of a general purpose programming language, validate data, send a data store manipulation request, send a request to another service, save data to a file server, deploy an application, deploy an application service, deploy a user session or other authorization service, create a socket connection, and perform complex tasks like image processing, data analysis and simulations.

The find object module 2020 may be used to reference objects and properties. The find object module 2020 may allow service, request, event context, and other properties to be easily referenced. The find object module 2020 may be configured like the application 100A find object module 222 shown in FIG. 2, and implemented as shown in FIG. 11.

Proxy Request Modules—FIGS. 19A, and 20

The proxy request modules 2012 may allow the service 1900A to easily provide a familiar interface to special resources and commonly used service functions. Proxy request modules 2012 may comprise: a data store request module 2020, and a session request module 2022. Functions provided by the proxy request modules 2012 may also be implemented using custom service event procedures as described above.

The data store request module 2020 may be used to respond to a proxy data store request. The proxy data store request may comprise a proxy data store request type and a number of proxy data store request parameters. Parameters that may effect operations performed by the data store request module 2020 may comprise: request parameters, an approved access level definition, and a proxy data store definition defined in the service definition 1902A.

Processing the proxy data store request may involve accessing and changing aspects of a data store associated with the service 1900A, as described by the proxy data store definition. In this embodiment, the data store may be implemented by a database, and the proxy data store request may be processed by sending a request to this database. In other embodiments, the data store may be implemented by: a collection of documents in a document-oriented database, a table or number of related tables in a SQL database, and even a filtered portion of one of these.

The data store may be described by the data store definition defined in the service definition 1902A. The data store definition may describe the data store using property/value fields that may be easily described by known data description languages like JSON and XML. These fields may comprise: a data store type, references to other data stores, data store connection and authentication parameters, fields describing a data store schema, and fields specific to a data store type.

The data store definition may include fields describing the data store schema. In this embodiment, a number of field definitions may be used to describe the data store schema. A field definition may comprise: a field casting type, authorization requirements for modifying and reading a field, and procedures that may be triggered when a field is created or modified. A field definition may also contain references to other field definitions that describe relationships between the field definitions. For instance, a data store describing a collection of newspaper articles may include a title field and an author field in a first level. An author field may have a second level including fields containing a first name and a last name. These relationships may allow the data store schema to have many levels. A single field definition may also be used to describe many fields within the data store. For instance, a name field template may describe a field containing first name and last name fields. This name field template may be used to describe both an author field and an editor field.

Proxy data store request types may comprise: create record, read record, read records, update record, and delete record. Each request type may simply perform its nominal function or may be replaced by a procedure definition. The nominal function of a proxy data store request that has been replaced by a procedure definition may be performed by an action if desired. Some uses of proxy data store request replacement procedures may be: performing validation of data before creating a new record, updating a "time modified" field when an update is performed, or creating records in another data store to track changes made to a record.

The session request module 2022 may be used to respond to a proxy session request. The proxy session request may comprise: a proxy session request type, an access level reference, and a number of proxy session request parameters. An access level definition associated with the request may reference a user session managed by the request authorization module 2004. The session request module 2022 may perform its function by sending a request to the service used to manage the user session. Proxy session request types may comprise: create session, get session, and destroy session.

Service Definition Generation

The simple property/value structure of a service definition may allow service definitions to be created by a number of methods. Service definitions may be generated by writing text documents, through the use of special development interface applications, and may also be generated by automated procedures.

One straightforward method of building a service definition is writing a text document conforming to the specifications of a multi-tenant application service. An embodiment of a very simple and human readable service definition is shown below. Several metadata fields not mentioned before have been added to this service definition, as was done in the application definition code example above.

```
{
   "Service ID"            : 1,
   "Name"                  : "Example Service Definition",
   "Default Access Level"  : "User",
   "Access Level Definitions" : {
      "User" : {
         "Allow All HTTP Origins Flag" : true,
         "Session"                     : "Service User Session",
         "Operation Flags"             : {
            "Create Record Flag" : true,
            "Read Record Flag" : true,
            "Record Owner"     : {
               "Update Record Flag" : true,
               "Delete Record Flag" : true
            }
         },
         "Proxy Data Store Restrictions" : {
            "Read Filter" : [
               {
                  "Type"     : "Boolean",
```

```
                  "Property" : "Approved",
                  "Condiiton" : true
               }
            ]
         }
      },
      "Administrator" : {
         "Allow All Origins Flag"  : true,
         "Session"                 : "Service Admin Session",
         "Operation Flags"         : {
            "Create Record Flag" : true,
            "Read Record Flag" : true,
            "Update Record Flag" : true,
            "Delete Record Flag" : true
         },
         "Field Authorization Flags" : {
            "Administrator" : true
         }
      }
   },
   "Proxy Data Store Definition" : {
      "Type"     : "MongoDB",
      "Location" : "192.168.0.100",
      "Collection Name" : "Example Data Store",
      "Root Field Definition Reference" : "Field Definition 1",
      "Field Definitions"               : {
         "Field Definition 1" : {
            "Name"              : "Root Field Definition",
            "Field Casting Type" : "Object",
            "Defined Properties" : {
               "Name"        : "Field Definition 2",
               "Description" : "Field Definition 2",
               "Approved"    : "Field Definition 3"
            }
         },
         "Field Definition 2" : {
            "Name"              : "Simple String",
            "Field Casting Type" : "String"
         },
         "Field Definition 3" : {
            "Name"              : "Boolean",
            "Field Casting Type" : "Boolean",
            "Write Authorization Flag" : "Administrator"
         }
      }
   }
}
```

The above service definition may describe a service that manages data store records. The data store and proxy data store interface are described by a "Proxy Data Store Definition" property. The data store definition describes a data store comprising a collection named "Example Data Store" managed by a MongoDB database accessible at a network address. A schema is defined for this data store by a "Root Field Definition Reference" property and a "Field Definitions" property. An example record created using this service is shown below in JSON.

```
{
   "Name"        : "Example Record",
   "Description" : "An example record created by an example service.",
   "Approved"    : true
}
```

The service definition defines two access levels using an "Access Level Definitions" property. The service definition also declares a default access level using a "Default Access Level" property.

The "User" access level may accept requests from all HTTP origins, but not from other tenant services. Request authorization may require a user session referenced as "Service User Session". Authorized requests may perform the following operations. Requests may create new records. Requests may read records that have a property named "Approved" with a boolean value true. Requests may update and delete records owned by the request owner. Also, the schema may specify a restriction. The field definition described by the property "Field Definition 3" and referenced by the root field property named "Approved" may require a field authorization flag named "Administrator" to allow a write operation. Because the access level does not grant this field authorization flag, requests may not modify the property named "Approved".

The "Administrator" access level may accept requests from all origins. Request authorization may require a user session referenced as "Service Admin Session". Authorized requests may create, read, update, and delete records, and may modify all properties defined in the schema definition.

Writing application and service definitions by hand is an awkward and tedious task that can be made much easier by a well designed application. An application that builds application and service definitions may be called a development interface. A development interface may present a developer with a variety of tools to aid in the construction of application, service and resource definitions. A discussion of embodiments of a development interface is provided in a later section.

Automated procedures may be used to generate service definitions, service components, and service resource definitions. There are a number of ways that this can be useful.

One straightforward method of automatically generating a service definition is to copy a service definition. This new service definition may then be edited independently of the original. Service definition templates may be implemented this way.

A service definition may also be generated by modifying a service definition in a predefined way and saving the result. This may be useful when deploying a service. As was mentioned above, it may be useful to add fields to a service definition to facilitate a development process. Procedures may be provided to remove unneeded object definitions and properties from a service definition before it is deployed.

Service resource definitions may be identical to service definitions. Procedures that automatically generate service resource definitions may facilitate sharing of service definition objects between service definitions. A development interface may implement tools that generate a new service resource definition from a portion of a service definition. This procedure may involve creating a resource definition containing a large number of object definitions. For example, a service event procedure may reference procedure templates. A procedure designed to create a resource from a service event may need to include the referenced procedure template definitions in the generated resource definition.

Application Generating System

Embodiments of a system for generating software applications and software application services that may generate other software applications and software application services are provided below. Embodiments of a system that may facilitate the creation of data-connected applications and families of related applications, by supporting an iterative process wherein one application may be used to create a second application that may be used to create a third application and so on, are also provided below. Embodiments of a system that may allow for the creation of a variety of specialized tools for creating different types of applications that may be specialized to appeal to different types of users with different needs and levels of skill are also provided. An embodiment for generating web applications and web services is also provided.

An embodiment of a system for generating applications and application services may comprise:

1) providing one or more application interpreter modules,
2) providing methods to save and modify application, service, and resource definitions to a persistent data store,
3) providing methods to generate applications by making an application definition available to an application interpreter module within an appropriate platform and,
4) providing one or more development interface applications to facilitate building of application, service, and resource definitions.

Figure 22:
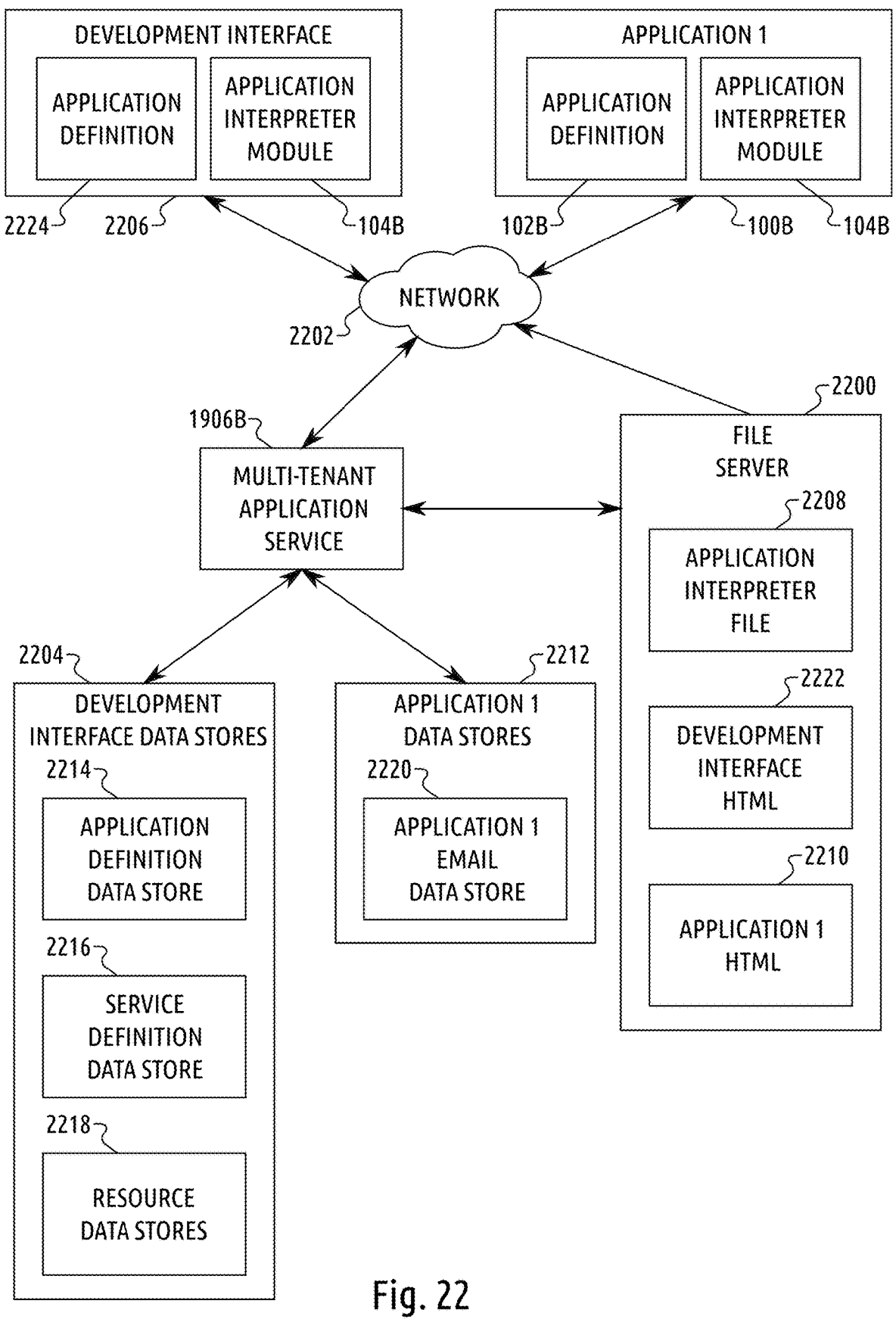
FIG. 22 is an example block diagram showing a system for creating web applications.

Application Generating System—Web Application—FIG. 22

FIG. 22 is an block diagram showing components of an embodiment of a system for generating web applications and services. FIG. 22 also shows components of an application 100B, and several application services generated by this embodiment. Components of this embodiment comprise: an application interpreter module 104B, a file server 2200, a computer network 2202, a multi-tenant application service 1906B, a number of development interface data stores 2204, and a development interface application 2206.

Figure 1B:
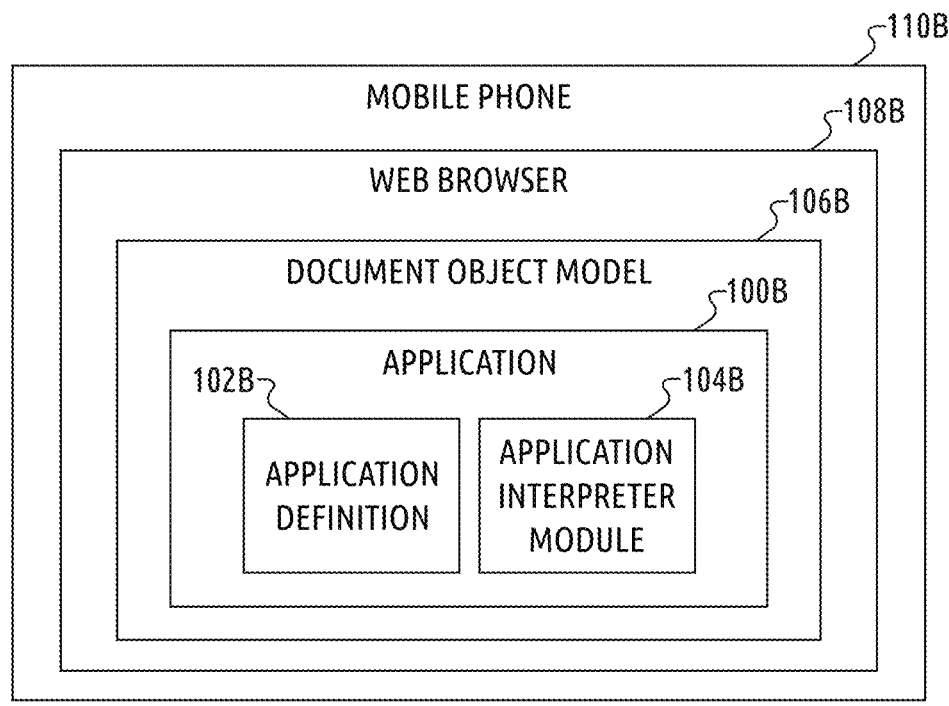
FIG. 1B is an example block diagram showing components of a web application.

Web Application—FIGS. 1B, 3, and 22

FIG. 1B is a block diagram showing runtime modules of a web application 100B. In this embodiment, an application interpreter module 104B uses an application definition 102B to execute an application 100B. During the runtime of the application 100B the application interpreter module 104B interacts with a document object model 106B of a web browser 108B, and the web browser 108B interacts with a mobile phone computing device 110B to perform functions of the application 100B.

In this embodiment, the application interpreter module 104B may be provided by a JavaScript file 2208. The application interpreter module file 2208 may be stored on the file server 2200. In this embodiment, GUI elements may comprise HTML elements, SVG elements, and results of canvas drawing commands. GUI objects may be associated with these GUI elements. Delegated event procedures may be registered using the Document Object Model 106B. Actions may be implemented using JavaScript and the Document Object Model 106B. Model objects may connect to services available in the same network as the web browser 108B.

The application definition 102B may be provided by a component of an application HTML file 2210 stored on the file server 2200. In this embodiment, the application definition 102B may be provided as JavaScript code that when executed creates a reference to a JavaScript object representing the application definition 104B. In other embodiments, an application definition may be stored in a separate file, or database. In some embodiments, an application HTML file may also include references to a number of supporting files, and may contain additional HTML markup providing an initial document structure.

The web application 100B may be executed by directing the web browser 108B to a network 2202 address of the application HTML file 2210. When the web browser 108B is directed to the network address of the application HTML file 2210, the browser 108B may first load the application HTML file 2210. Then, the application HTML file 2210 may instruct the browser 108B to load and execute the application interpreter module file 2208, retrieve the application definition 102B by executing the application definition JavaScript code, and make the application definition 102B available to the application interpreter module 104B by creating a reference to it on a known property. Finally, the application interpreter module 104B may be used to execute an application initialization procedure as described above and in FIG. 3.

Figure 19B:
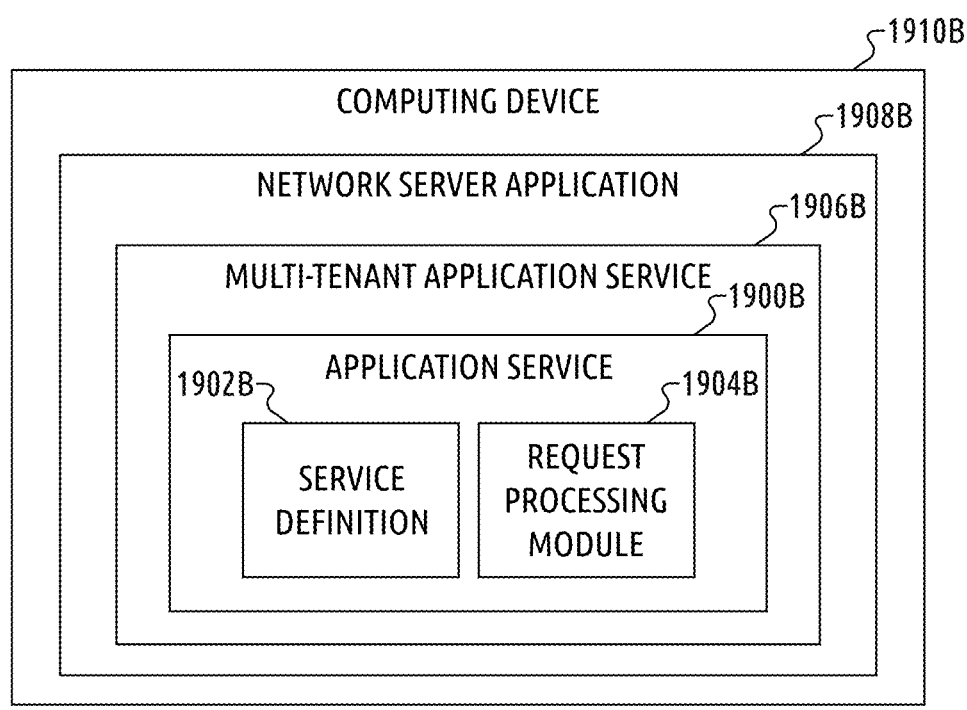
FIG. 19B is an example block diagram showing components of a network application service.

Web Application Service—FIGS. 19B, and 22

FIG. 19B is a block diagram showing runtime modules of a web application service 1900B. The web application service 1900B may also be referred to herein as a service, tenant service, or API. A service definition 1902B, a request processing module 1904B, and a multi-tenant application service 1906B may comprise runtime modules of the application service 1900B. The multi-tenant application service 1906B may send and receive requests by interacting with a network server application 1908B running on a computing device 1910B.

In this embodiment, a multi-tenant application service 1906B may be implemented on a network server 1910B, that is available in the same network 2202 as the mobile phone 110B, and is running the browser application 108B that will run the application 100B. The multi-tenant application service 1906B may be used to both provide services to applications, and to generate applications. Data stores 2204, and 2212 used by the multi-tenant application service 1906B may be implemented by database servers.

Web Application Generation

In this embodiment, the multi-tenant application service 1906B may provide tenant services configured to save and modify application, service, and resource definitions to persistent data stores 2204. An application definition tenant service may be created to manage an application definition data store 2214. A service definition tenant service may be created to manage a service definition data store 2216. Resource definition tenant services may be created to manage resource definition data stores 2218.

The multi-tenant application service 1906B may implement an action or actions for deploying web applications. Deploying the web application 100B may allow it to be executed by directing the web browser 108B to a network 2202 address. This may cause an application definition to be made available to an application interpreter module as described above. In this embodiment, this action or actions may first cause the application definition 102B to be retrieved from the application definition data store 2214. Next, the application definition 102B may be used to generate JavaScript code that when executed creates a reference to a JavaScript object representing the application definition 102B. Next, the application definition 102B may be used to generate an HTML file 2210 that loads the application interpreter module file 2208, and executes the application definition generation code. Finally, the application HTML file 2210 may then be uploaded to the file server 2200.

When a web application is generated, a number of optimizations are possible. For instance, HTML elements may be defined in an HTML file to produce an initial set of elements to be assigned to GUI objects. Also, an application definition may define CSS rule definitions to be used by an application. A CSS file may be generated that includes these rules. An application may load this CSS file and others when an application is initialized, and the rules defined in these CSS files may be used to alter the appearance of GUI objects.

The simple structure of HTML and CSS documents may allow a number of special development tools to be implemented. For instance, procedures for converting preexisting HTML and CSS documents into application definitions may be provided. This may be thought of as importing a document. The same concepts may be expanded to import a complete web page, HTML email, or other XML document.

The multi-tenant application service 1906B may also implement an action or actions for deploying tenant services. Deploying the tenant service 1900B may allow the multi-tenant application service 1906B to respond to requests to this tenant service. The multi-tenant application service 1906B may do this by making the service definition 1902B available to the request processing module 1904B as described above. The tenant service 1900B may may be configured to receive requests from the application 100B, and to manage an email data store 2220.

Development Interface—FIGS. 23-28

In this embodiment, a development interface application 2206 may be provided to facilitate building of application, service, and resource definitions. The development interface application 2206 may be an application of the same type that is generated by this embodiment. It may also be supported by the same multi-tenant application service 1906B that supports other applications generated by this embodiment.

The development interface application 2206 may be executed by directing a web browser to a network 2202 address of a development interface HTML file 2222. When the web browser is directed to the network address of the HTML file 2222, the browser may load the application HTML file 2222. Then, the development interface application may be executed by making the application definition 2224 available to the application interpreter module 104B and executing an application initialization procedure as described above and in FIG. 3.

Figure 23:
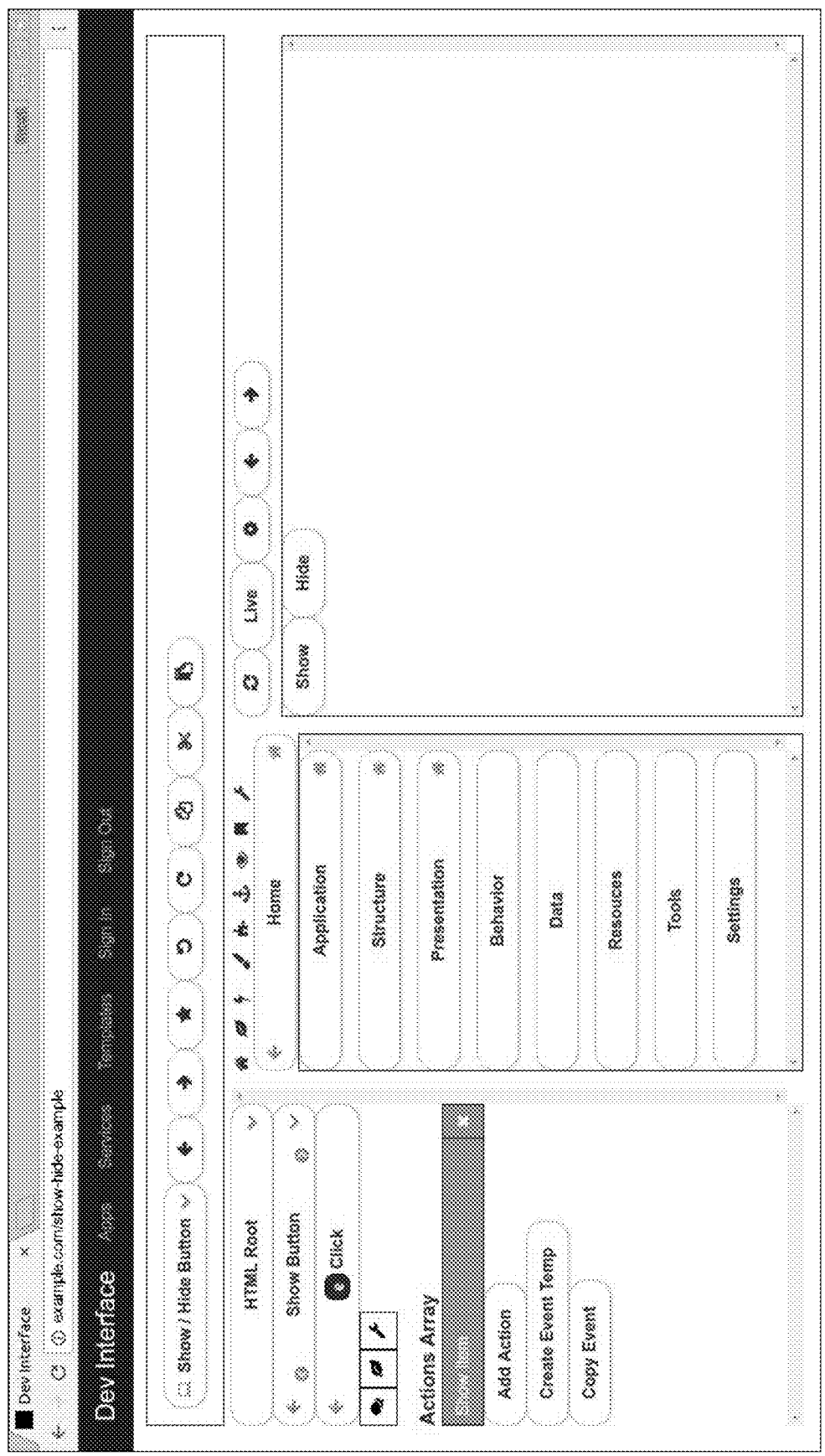
FIG. 23 is a screenshot of an embodiment of a development interface editing a simple application definition.

FIG. 23 shows a screen shot of the development interface 2206. Aspects of the development interface 2206 shown in FIG. 23 comprise a header, a tool bar, an edit column, a select column, and a preview window. The header comprises menu options to display a list of other application definitions, a list of other service definitions, a list of resource definitions, and a log out button. The tool bar comprises a tool for displaying a current definition type and name, and a number of editing tools. An application similar to the application definition example named "Hand Written Application" is currently being edited.

The edit column comprises a GUI object branch navigation tool, a general branch navigation tool, and a number of forms. Each of the forms may be designed to display and edit properties of an application object definition. The edit column may be configured so that only one form is shown at a time. The GUI object and general branch navigation tools may provide information about an application object definition displayed in the current edit column form, the object's position within a hierarchy of object definitions, and facilitate navigation within and relative to this hierarchy of object definitions. Edit column forms may comprise:

Application Form
Distribution Definition Form
Basing Template Definition Form
GUI Object Definition Form
Model Definition Form
Procedure Definition Form
Action Definition Form
Object Definition Form
CSS Style Sheet Definition Form
CSS Rule Definition Form
CSS Class Definition Form
Service Form
Field Definition Form
Property Definition Form An application form may contain general application definition properties. A service form may contain general service definition properties. An object form may contain tools for building arbitrary objects and arrays. The rest of the forms may contain the properties of their corresponding application definition object. The procedure form is shown in FIG. 23. It is currently displaying a list of action definitions contained in a click event procedure of a GUI object definition named "Show Button".

The select column comprises: a select shortcuts icon bar, a select navigation tool, and a number of tools for navigating and editing an application definition. These tools may comprise a number of menus of links to other tools and sub-menus, forms to customize the behavior of the development interface, and tables of object definitions. The object definition tables may allow selection of object definitions to be created, copied, edited, inserted, referenced and deleted. The object definition tables may include:

Container Copies/Widgets
GUI Object Definitions
Cut GUI Object Definitions
Clone GUI Object Definitions
Copied GUI Object Definitions
Native GUI Object Extension Templates
Custom GUI Object Extension Templates
Procedure Definition Copies
Native Procedure Templates
Custom Procedure Templates
Native CSS Classes
Custom CSS Classes
Model Definition Copies
Native Model Extension Templates
Custom Model Extension Templates
Included Resources
External Resources
Service Gateways
Field Definitions
Copied Field Definitions
CSS Properties
HTML Attributes
HTML Element Tag Names
Action Types
Select Preview View Definitions
Select Preview View Form
Application Definition Bookmarks
Application Definition Bookmark Form The preview window may display a preview of an application definition, application component, or container copy. A preview may be used to inspect an application definition or container copy, test an application definition, or facilitate the development process.

A live preview of an application definition may be created as a sub-application. The live preview may behave just like an application would when deployed. A live preview may be used to test an application within the development interface. Tools may also be provided to allow a developer to inspect and modify objects of a live preview during its execution.

A preview of an application may also be used to facilitate a development process. A special type of preview that displays all GUI object definitions included in a container may be used to facilitate the selection of GUI object definition objects for editing. This type of preview may be called a select preview. When a user clicks on a select preview, the object definition that was clicked may be loaded in a GUI object form.

A development interface may also provide tools to make the task of building application, service and resource definitions easier. For instance, tools for showing and hiding various GUI objects in the preview window may be provided and collections of hidden GUI objects may be saved. Such a collection may be called a view. Another example of a development interface tool may be application object definition bookmarks. These types of bookmarks may allow a user to easily navigate to commonly viewed application object definitions and may even change a view displayed in a preview window.

A development interface may also provide tools to manage applications, services, resources and their corresponding definitions. These tools may allow new application, service and resource definitions to be generated from templates, copied and deleted. Other tools that provide version management and access control may also be provided.

A good development interface can make complex tasks much easier. For example, if a developer wanted to make their own customized version of a development interface, they could do the following. First, they could create a copy of a development interface application definition. Next, they could make changes to the application definition as desired. Finally, they could deploy the application as desired.

Figure 24:
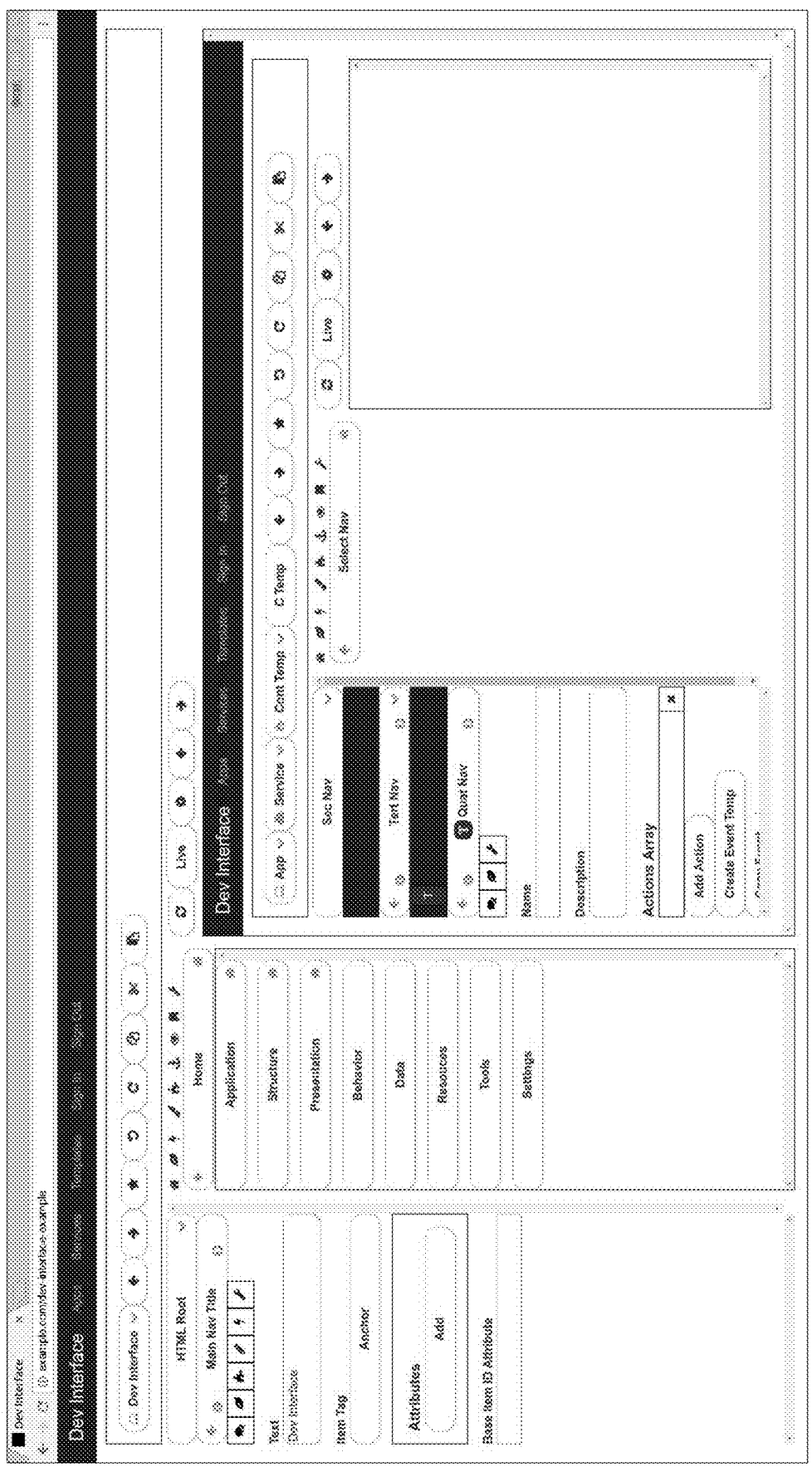
FIG. 24 is a screenshot of an embodiment of a development interface editing a development interface application definition.

FIG. 24 shows a view of a development interface being used to edit a copy of its own application definition. The edit column shows the GUI object form. Fields used to edit GUI object definition text are visible. The branch navigation tool indicates that a GUI object definition named "Main Nav Title" is displayed in the form below. This configuration may have been reached by clicking on a representation of the "Main Nav Title" GUI object in the select preview window. Changes may be made to this GUI object definition using this GUI object form. For instance, the text of the "Main Nav Title" GUI object may be changed from "Dev Interface" to "My Dev Interface" by changing the text in the text area input labeled "Text".

Figure 25:
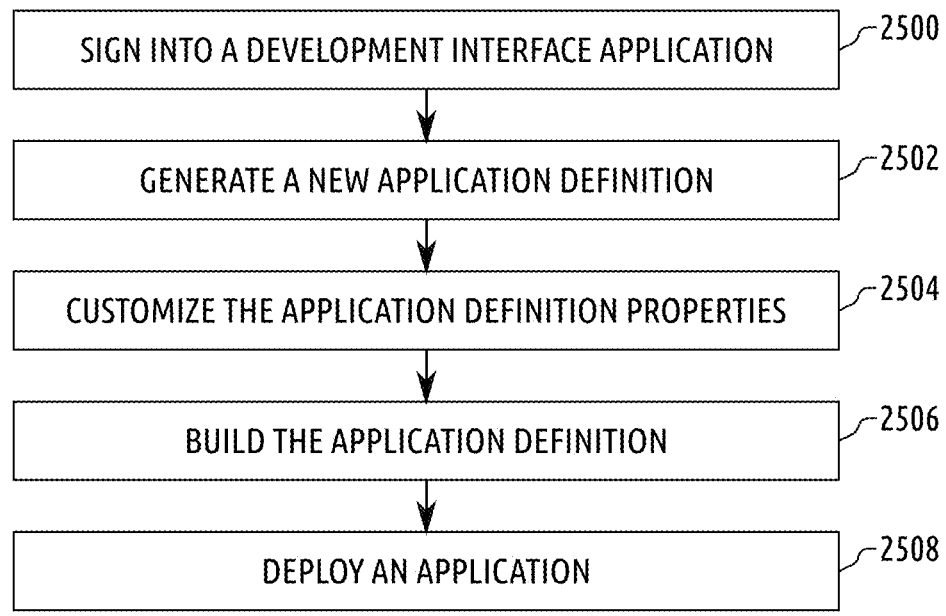
FIG. 25 is an example flow chart showing a general procedure for building an application definition using an embodiment of a development interface.

In this embodiment of a development interface, applications may be generated using the general procedure shown in FIG. 25. First, a user may log into a development interface application 2500. Signing in may allow a user to access and save application, service and resource definitions that are available to them. Next, a user may generate a new application definition and open it for editing 2502. This may involve selecting an application definition template to be used as a starting point for building an application definition. Then, a user may customize the application definition properties 2504. This may involve naming the application definition, adding distribution definitions, adding basing template definitions, including resources, adding a root HTML GUI object, and adding application event procedure definitions. Next, a user may build the application definition by creating and arranging any number of application object definitions 2506. This may involve creating and referencing GUI object definitions, model definitions, procedure definitions, action definitions, context definitions and their corresponding copies and templates. Finally, a user may deploy an application 2508. This may involve using a distribution template that specifies specific basing templates to be applied and other environment specific properties.

Development Interface—Customization

The embodiment shown in FIG. 22 may allow for the creation of a variety of specialized development interface applications and other tools for creating applications and services. These tools may be customized to facilitate the development of different types of applications and services and to appeal to different types of developers with different needs and levels of skill. Methods of providing customized development tools may include modifying object and object template definitions provided when starting a new application or service definition, modifying resources available to a development interface, and providing a customized development interface application.

The embodiment shown in FIG. 22 may provide many customized development interface applications and generate new development interface applications. The embodiment shown in FIG. 22 may support an iterative process wherein one development interface application may be used to create a second development interface application that may be used to create a third application and so on. This iterative process of progressively customizing development interfaces may result in providing a variety of specialized tools for creating different types of applications and services.

The embodiment shown in FIG. 22 may generate a development interface capable of using an application definition to persist and display data in complex ways that would not otherwise be possible. An application definition used in this way may be called rich data. An application generated by the embodiment shown in FIG. 22 may use tenant services to persist and consume rich data application definitions as sub-applications. For example, many websites collect comments about blog entries or articles. A comment is usually saved as a number of strings. A comment could also be saved as an application definition. A special interface with some of the tools of a development interface may be provided. One of the tools may allow a user to place a widget in a comment. When the widget is clicked by a user viewing the comment, it may cause an application to scroll to and highlight specified text within an associated article.

Figure 26A:
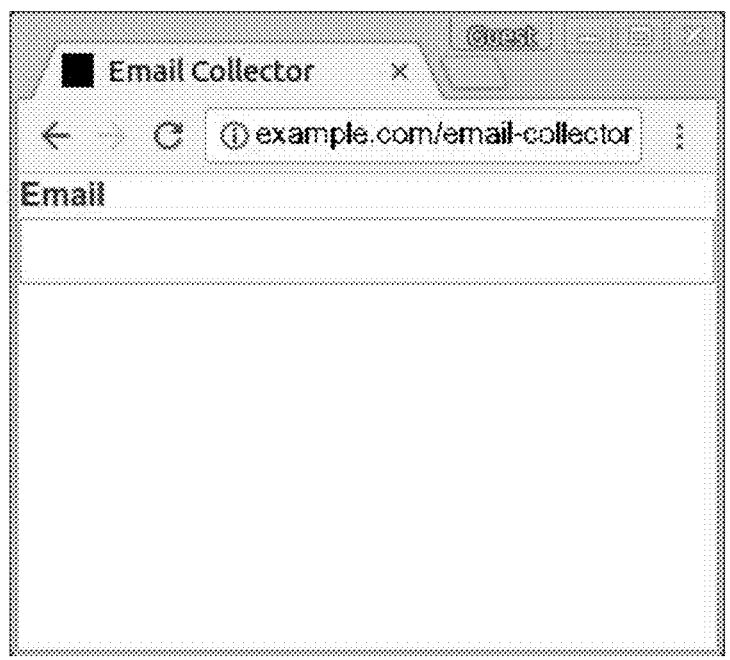
FIG. 26A is a screenshot of an email collector application generated from an application definition built by a development interface using a procedure described herein.

Development Interface—Example Procedures—Web Application Generation—FIG. 26A

A detailed procedure for generating a simple web application that collects email addresses is provided below. Procedures for creating application definitions, GUI object definitions, procedure definitions, model definitions, applying GUI object extension templates to GUI object definitions, using customization dialogs associated with GUI object extension templates, and deploying an application are described. FIG. 26A is a screenshot of a web application generated using this procedure.

1. Sign into a development interface application.
2. Select the option to generate and edit a new web application definition using a template with a single container.
3. Customize the application definition properties.
    3.1 . . . Change the name of the application definition to "Email Collector" by typing in the text input labeled "Name".
4. Build the application definition.
    4.1 . . . Navigate to the GUI object form of the base container (generated by the template) by clicking on the "Home" icon inside the "Structure" shortcut of the shortcut menu.
    4.2 . . . Create a "form" context and model when the base container is initialized.
        4.2.1. Navigate to the behavior view of the GUI object form by clicking the "lightning bolt" tab.
        4.2.2. Add a new "Early Initialization" event procedure definition by selecting it from the "Add Event" select list of the "Native Events" list.
        4.2.3. Navigate to the procedure form of the new event procedure definition by clicking on it.
        4.2.4. Navigate to the action form of the default "Dummy" action by clicking on it in the actions list.
        4.2.5. Select the "Create Context and Set" action type from the select input labeled "Action Type".
        4.2.6. Type the text "form" in the text input labeled "Context Reference Name".
        4.2.7. Navigate back to the procedure form by clicking on the large arrow pointing left at the left side of the general branch navigation tool.
        4.2.8. Add a new action to the procedure by clicking on the button labeled "Add Action".
        4.2.9. Navigate to the action form of the new action by clicking on it.
        4.2.10. Select the "Create Model" action type from the select input labeled "Action Type".
        4.2.11. Type "model" in the text input labeled "Event Context Property".
        4.2.12. Navigate to the model form of the model that will be generated by this action by clicking on the button labeled "Add Model Definition".
        4.2.13. Select the "External Data" model type from the select input labeled "Model Type".
        4.2.14. Open the Service Gateway Form by clicking on the button labeled "Service Gateway".
        4.2.15. Create a new service gateway by clicking on the button labeled "Add" in the Service Gateway Form.
        4.2.16. Change the name of the new service gateway to "Emails" by typing in the text input labeled "Name" of the service gateway dialog that appears.
        4.2.17. Close the service gateway dialog by clicking on the button labeled done inside the service gateway dialog.
        4.2.18. Select the new service gateway by clicking on it.
        4.2.19. Navigate back to the procedure form by clicking on the large arrow pointing left at the left side of the general branch navigation tool twice.
        4.2.20. Add a new action to the procedure by clicking on the button labeled "Add Action".
        4.2.21. Navigate to the action form of the new action by clicking on it.
        4.2.22. Select the "Set Model" action type from the select input labeled "Action Type".
        4.2.23. Add two levels to the object map input labeled "Model to Set" by clicking the button labeled "Add Level" twice.
        4.2.24. Select the "Event Context" reference type from the select list within the first object map reference level.
        4.2.25. Select the "Model" reference type from the select list within the second object map reference level.
        4.2.26. Type the text "model" in the text input within the second object map reference level.
        4.2.27. Type the text "model" in the text input labeled "Reference Name".
    4.3 . . . Create an email input.
        4.3.1. Navigate to the container children view of the GUI object form by clicking the "leaf" tab.
        4.3.2. Add a new child GUI object to the root container by clicking the add GUI object button.
        4.3.3. Navigate to the new GUI object by clicking on it in the child GUI objects list.
        4.3.4. Add two new child GUI objects to the GUI object by clicking the add GUI object button twice.

4.3.5. Navigate to the first new GUI object by clicking on it in the child GUI objects list.
4.3.6. Navigate to the structure view of the GUI object form by clicking the "pencil" tab.
4.3.7. Type the text "Email" in the text input labeled "Text".
4.3.8. Select the "Label" element type from the select input labeled "GUI object Tag".
4.3.9. Navigate to the second new GUI object by clicking on the small right arrow in the in the GUI object branch navigation tool.
4.3.10. Select the "Input" element type from the select input labeled "GUI object Tag".
4.3.11. Navigate to the templates view of the GUI object form by clicking the "puzzle piece" tab.
4.3.12. Open the Native Templates List by clicking on the button labeled "Structure" in the Shortcut column and then clicking on the button labeled "Native GUI object Extension Templates" OR by clicking on the button labeled "Add" under the GUI object Templates list.
4.3.13. Add the GUI object extension template called "Text Input Save Known Property" by dragging it from the list to the list labeled "Extension Templates" in the GUI object Form OR by clicking the "plus" icon associated with it.
4.3.14. Type the text "email" in the text input labeled "Field" in the dialog that appears.
5. Deploy the application.
5.1 . . . Navigate to the application form by clicking on the "Home" icon inside the "Application" shortcut of the shortcut menu.
5.2 . . . Navigate to the distributions view of the application form by clicking on the "cloud" tab.
5.3 . . . Deploy the default application by clicking on the cloud icon containing an upward pointing arrow that is associated with the default distribution definition in the distributions list.

Figure 26B:
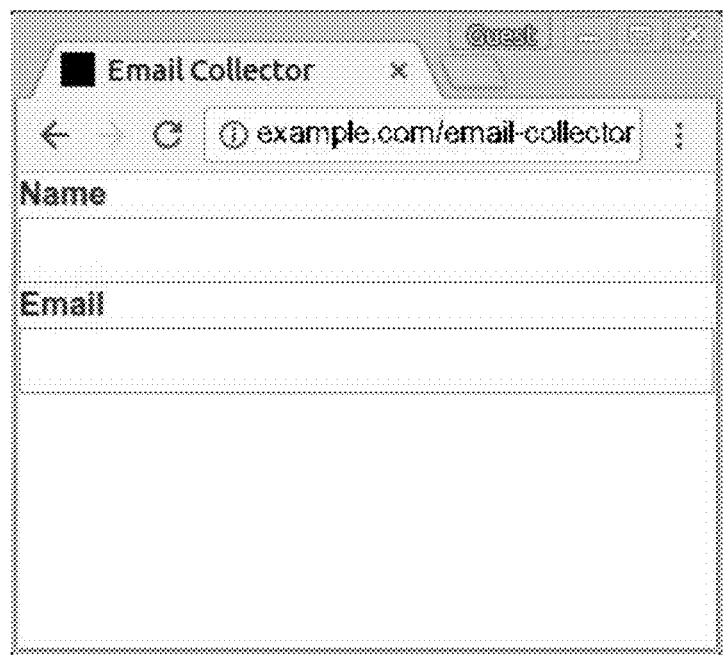
FIG. 26B is a screenshot of an email collector application after adding a "Name" input using a procedure described herein involving container copies.

Development Interface—Example Procedures—Container Copies—FIG. 26B

The development interface 2206 may facilitate the manipulation of application, service and resource definitions in a number of ways. For instance, container copies may be created and inserted into other GUI objects. An example procedure for using a container copy to add a "Name" field to the "Email Collector" example above is provided below. Most of the object template definition types described above may be made use of in a similar fashion and also be generated from scratch. FIG. 26B is a screenshot of a web application generated by following this procedure and then deploying an application.

1. Create a container copy.
    1.1 . . . Navigate to the GUI object form of the GUI object that contains the email input and label.
    1.2 . . . Navigate to the tools view of the GUI object form by clicking on the "wrench" tab.
    1.3 . . . Click the button labeled "Create Container Copy".
    1.4 . . . Name the container copy "Email Input" by typing in the dialog that appears.
2. Insert a copy of the container copy into a GUI object.
    2.1 . . . Navigate to the GUI object form of the root container.
    2.2 . . . Navigate to the container children view of the GUI object form.
    2.3 . . . Navigate to the container copy view of the select column.
    2.4 . . . Drag the "Email Input" row to the child GUI object list of the GUI object form.
3. Modify the new GUI object.
    3.1 . . . Navigate to the GUI object form of the new GUI object containing the label text by clicking on it in the select preview.
    3.2 . . . Navigate to the structure view of the GUI object form by clicking on the "pencil" tab.
    3.3 . . . Change the text from "Email" to "Name" by typing in the text input labeled "Text".
    3.4 . . . Navigate to the second new GUI object containing the text input by clicking on it in the select preview.
    3.5 . . . Navigate to the templates view of the GUI object form by clicking the "puzzle piece" tab.
    3.6 . . . Open the template configuration dialog by clicking on the sprocket icon associated with the GUI object extension template named "Text Input Save Known Property".
    3.7 . . . Change the text in the input labeled "Field" from "email" to "name".

Figure 26C:
FIG. 26C is a screenshot of an email collector application when a "Spanish" basing template is applied.
Figure 27:
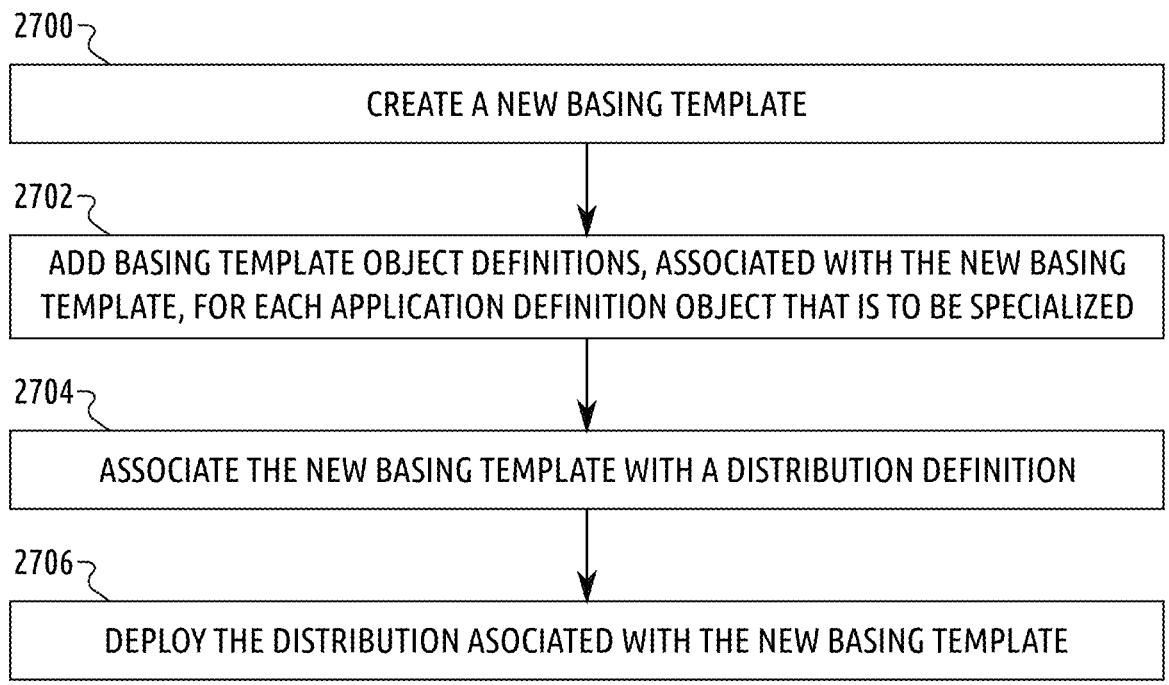
FIG. 27 is an example flow chart showing a general procedure for creating and applying a basing template using an embodiment of a development interface.

Development Interface—Example Procedures—Basing Templates—FIGS. 26C, and 27

Basing templates may require further explanation to understand. FIG. 27 is an example flow chart showing a general procedure for creating and applying a basing template to an application definition by using an embodiment of a development interface. First, a basing template may be created 2700. Creating the basing template may be like labeling a folder that will hold all of the changes that will be made when a basing template is applied to a distribution. Next, object definitions may be added to the new basing template 2702. These object definitions may define properties that will override those of an object definition that they are associated with. These properties specify the ways an application definition will be specialized when a basing template is applied to it. Next, the new basing template may be associated with a distribution definition 2704. This associating may be like telling the process that will generate an application that this basing template should be applied when creating a runtime application definition. Finally, an application may be deployed using the distribution definition associated with the new basing template 2706. Using this procedure, any number of different versions of an application can be generated using the same application definition. A detailed procedure for using a basing template to create a Spanish language version the "Email Collector" example above is provided below. FIG. 26C is a screenshot of a web application generated using this procedure.

1. Create a new basing template.
    1.1. Navigate to the application form by clicking on the "Home" icon inside the "Application" shortcut of the shortcut menu.
    1.2. Navigate to the application templates view of the application form by clicking on the "puzzle piece" tab.
    1.3. Create a new basing template by clicking the button labeled "Add" in the basing templates list.
    1.4. Navigate to the basing template form of the new basing template by clicking on the new basing template.
    1.5. Change the name of the new basing template to "Spanish" by typing in the text input labeled "Name".
2. Add basing template object definitions, associated with the new basing template, for each application definition object that is to be specialized.

2.1. Navigate to the GUI object form of the GUI object containing the text "Name" by clicking on it in the select preview.
2.2. Navigate to the templates view of the GUI object form by clicking the "puzzle piece" tab.
2.3. Create a new basing template object definition for this GUI object by clicking on the basing template labeled "Spanish" in the select list labeled "New" that is associated with the basing templates list.
2.4. Navigate to the basing template form of the "Spanish" basing template for this GUI object by clicking on it in the basing templates list.
2.5. Navigate to the structure view of the GUI object form by clicking on the "pencil" tab.
2.6. Type the text "Nombre" in the text input labeled "Text".
2.7. Navigate to the GUI object form of the GUI object containing the text "Email" by clicking on it in the select preview.
2.8. Navigate to the templates view of the GUI object form by clicking the "puzzle piece" tab.
2.9. Create a new basing template object definition for this GUI object by clicking on the basing template labeled "Spanish" in the select list labeled "New" that is associated with the basing templates list.
2.10. Navigate to the basing template form of the "Spanish" basing template for this GUI object by clicking on it in the basing templates list.
2.11. Navigate to the structure view of the GUI object form by clicking on the "pencil" tab.
2.12. Type the text "Correro Electónico" in the text input labeled "Text".
3. Associate the new basing template with a distribution definition.
3.1. Navigate to the application form by clicking on the "Home" icon inside the "Application" shortcut of the shortcut menu.
3.2. Navigate to the distributions view of the application form by clicking on the "cloud" tab.
3.3. Create a new distribution by clicking the button labeled "Add" in the distributions list.
3.4. Navigate to the distribution form of the new distribution by clicking on it in the distributions list.
3.5. Change the name of the new distribution to "Spanish" by typing in the text input labeled "Name".
3.6. Associate the basing template named "Spanish" with this distribution by selecting it from the select list labeled "Add Basing Template".
4. Deploy the distribution associated with the new basing template.
4.1. Deploy the Spanish language application by clicking on the button labeled "Deploy" in the distribution form of the distribution named "Spanish".

Figure 26D:
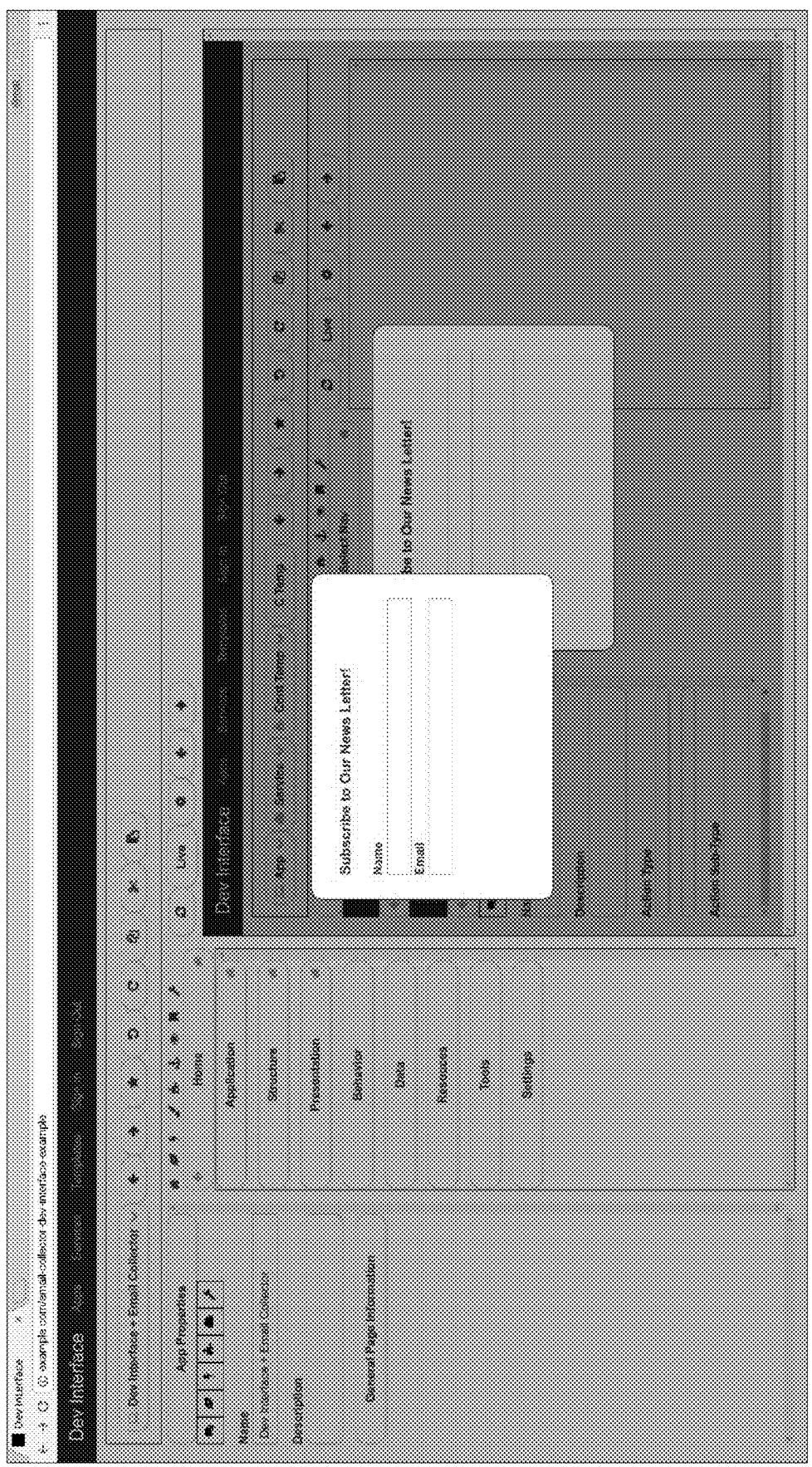
FIG. 26D is a screenshot of an application built using components from an "Email Form" resource using a procedure described herein.

Development Interface—Example Procedures—Resources—FIG. 26D

Resource definitions may require further explanation to understand as well. Resource definitions may be created from scratch and though other mechanisms. Building a resource from scratch may be very similar to the procedure described above for building an email collector application. In fact, the "Email Collector" application definition could be saved and used as an application resource. A resource definition may be included in an application or service definition. When a resource is included in another application or service definition, the template object definitions of the resource definition may be copied into the application or service definition. For instance, if the "Email Collector" application definition was saved as an application resource and was then included into another application definition, the container copy that was created would be available for use in this application definition.

Template object definitions defined in a resource definition may be copied into another application, service or resource definition by including them in the application, service or resource definition. Once these template objects definitions have been copied, they may be used just like another template object definition. However, special tools may be made available for their management and some restrictions may be placed on a user's ability to modify them. For instance, it may be undesirable for a user to delete a template object definition originating from a resource because it may be a dependency of another template object definition. Because of this, it may be helpful to restrict the ability of users to delete template object definitions originating from resources. It may also be helpful to provide a tool to update template object definitions that have been copied into an application definition. A tool like this may retrieve changes to the template object definitions that have been made since the resource was included in the application, service or resource definition.

A detailed procedure for including a resource and using the template object definitions provided by it is provided below. The procedure assumes that an application resource called "Email Form" has been created. The "Email Form" resource contains a container copy called "Email Form". The "Email Form" container copy contains the whole form created in the "Email Collector" example above. It also assumes that a new application has been started. FIG. 26D is a screenshot of a web application generated using this procedure. The screenshot shows the "Email Form" being used in an application similar to the development interface application shown in FIG. 23.

1. Navigate to the resources list of the select column by clicking the button labeled "Resources" in the shortcuts menu.
2. Navigate to the add resource view of the select column by clicking the button labeled "Add".
3. Include the "Email Form" resource by clicking on the "plus" icon associated with it in the list.
4. Navigate to the GUI object form of a GUI object that a container copy is to be added to.
5. Navigate to the container children view of the GUI object form.
6. Navigate to the container copy view of the select column.
7. Drag the "Email Form" row to the child GUI object list of the GUI object form.

Figure 28:
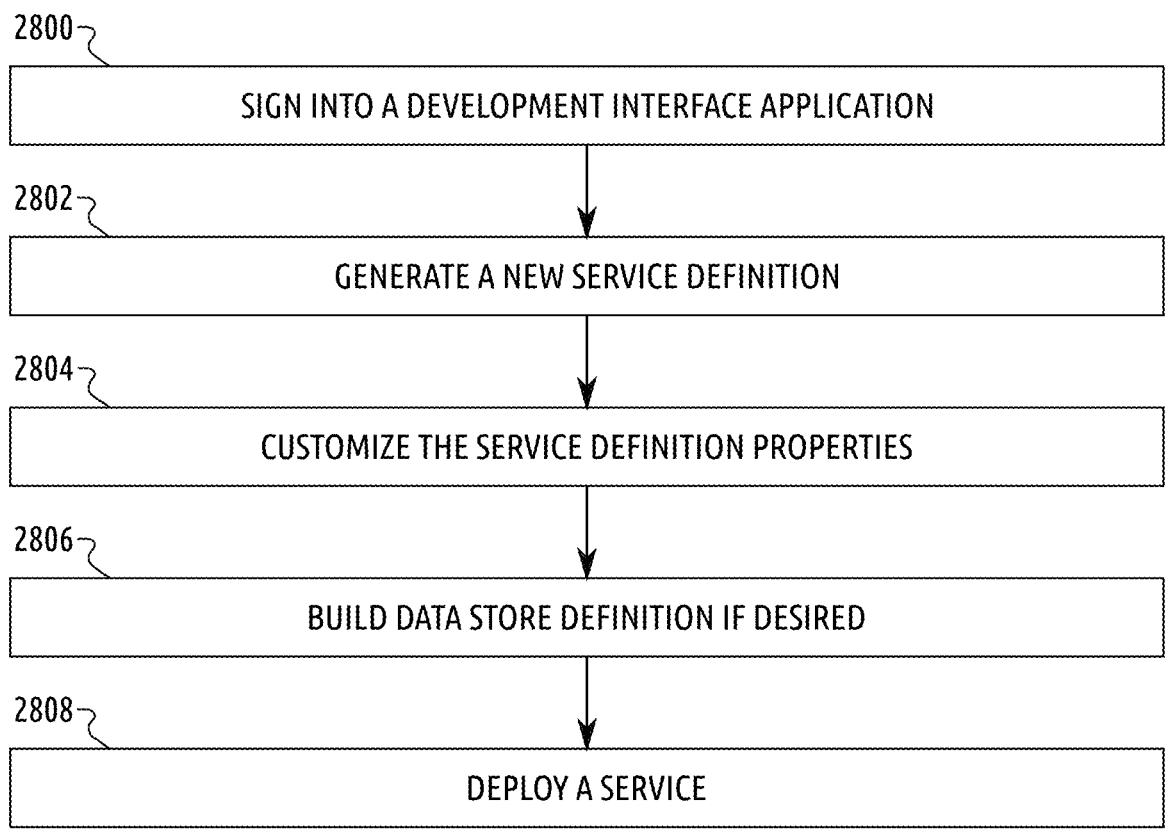
FIG. 28 is an example flow chart showing a general procedure for building a service definition using an embodiment of a development interface.

Development Interface—Example Procedures—Services—FIG. 28

In this embodiment of a development interface, services may be generated using the general procedure shown in FIG. 28. First, a user may log into a development interface application 2800. Signing in may allow a user to access and save application, service and resource definitions that are available to them. Next, a user may generate a new service definition and open it for editing 2802. This may involve selecting a service definition template to be used as a starting point for building a service definition. Then, a user may customize the service definition properties 2804. This may involve naming the service definition, adding distribution definitions, adding basing template definitions, adding a data store definition, adding access level definitions, including resources, and adding service event procedure definitions. Next, a user may build the data store definition by creating and arranging any number of service object definitions 2806. Finally, a user may deploy a service 2808. This may involve using a distribution template that specifies specific basing templates to be applied and other environment specific properties.

A detailed procedure for generating a simple service that saves names and email addresses in a data store is provided below. This service may be used by an application generated using the "Email Collector" application definition example above. It is important to note that the service gateway used in the "Email Collector" application definition above is associated with the service distribution built in this example. This association may connect this service distribution with applications generated using the "Email Collector" application definition. Changing the service gateway in either the service definition or the application definition and redeploying may change the way applications and services interact. One use of service gateways may allow for a single application definition to produce applications that interact with different services in the same way. One way to accomplish this is to use a model basing template to define a service gateway for different distributions. For example, one application distribution that is used for development and testing may connect to a development service, another application distribution that is used in production for collecting emails for sales contact requests may use another service, and a third application distribution that is used in production for collecting newsletter registration requests may use a third. Each of these different services may be generated using distributions of the same service definition. Procedures for creating service definitions, field definitions, and deploying an application are described below.

1. Sign in to the development interface application.
2. Select the option to generate and edit a new simple data store service definition.
3. Customize the service definition properties.
   3.1. Change the name of the service definition to "Email Collector" by typing in the text input labeled "Name".
4. Build the data store definition.
   4.1. Navigate to the field form of the root field definition by clicking on the "Home" icon inside the "Structure" shortcut of the shortcut menu.
   4.2. Add two new child properties to the root field by clicking the button labeled "Add" associated with the properties list twice.
   4.3. Navigate to the property form of the first new property by clicking on it in the properties list.
   4.4. Set the data store property name of the property to "name" by typing in the text input labeled "Property Label".
   4.5. Navigate to the field list in the select column.
   4.6. Set the property field definition to "String General Access" by clicking on the "plus" icon associated with this field.
   4.7. Navigate to the second new property by clicking on the small right arrow in the general branch navigation tool.
   4.8. Set the data store property name of the property to "email" by typing in the text input labeled "Property Label".
   4.9. Set the property field definition to "String General Access" by clicking on the "plus" icon associated with this field.
5. Deploy the tenant service.
   5.1. . . . Navigate to the service form by clicking on the "Home" icon inside the "Service" shortcut of the shortcut menu.
   5.2. . . . Navigate to the distributions view of the service form by clicking on the "cloud" tab.
   5.3. . . . Navigate to the distribution form of the default distribution by clicking on it in the distributions list.
   5.4. . . . Open the service gateway list in the select column by clicking on the button labeled "Add" under the input labeled "Service Gateway".
   5.5. . . . Associate the service gateway named "Emails" created in the "Email Collector" example above with this distribution by finding it in the service gateway list and clicking the "plus" icon associated with it.
   5.6. . . . Deploy the default service by clicking on the button labeled "Deploy" in the distribution form.

Figure 29:
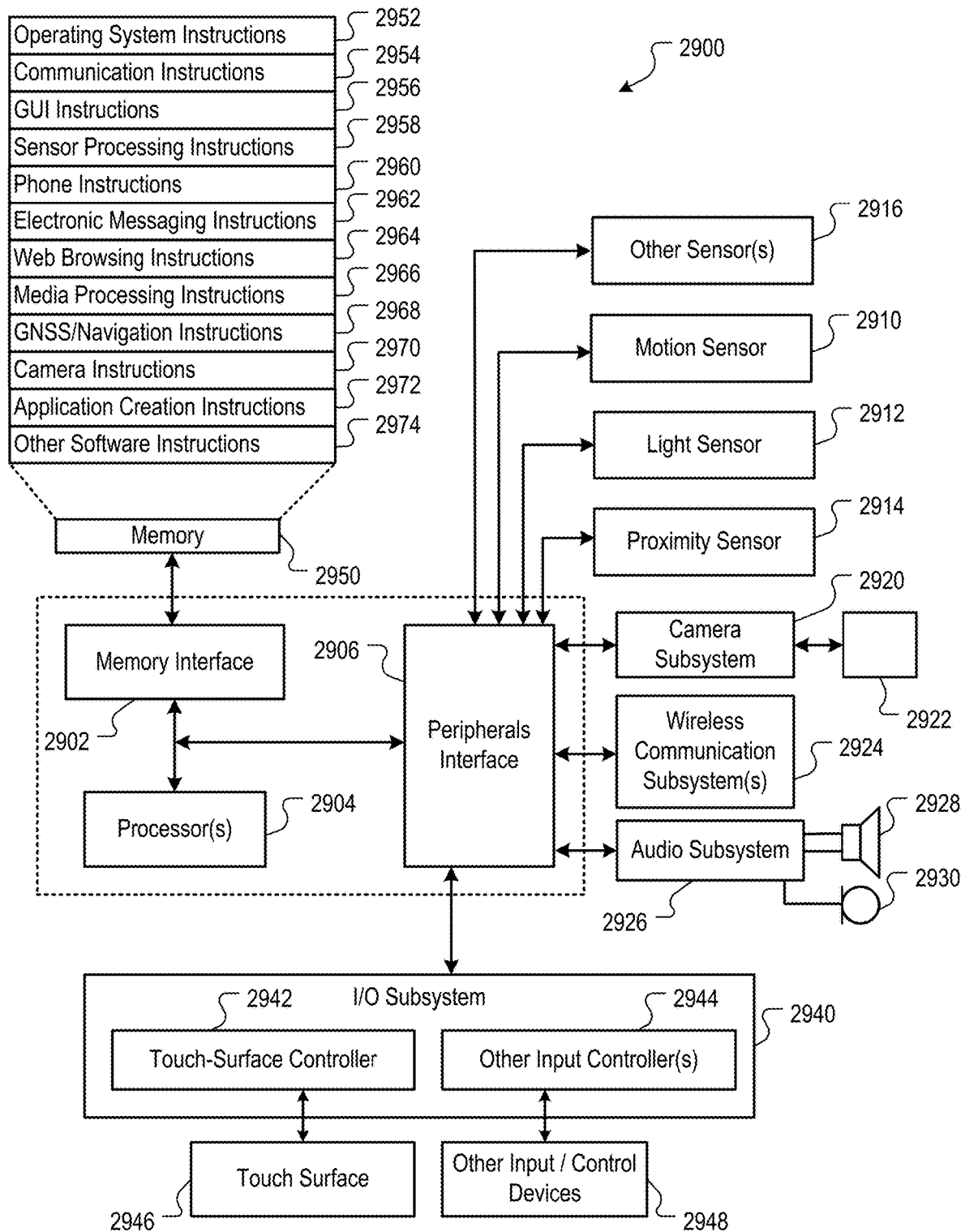
FIG. 29 is an example block diagram of a computing device configured to implement the features and functions described in FIGS. 1-28.

Example System Architecture—FIGS. 29-30

FIG. 29 is a block diagram of an example computing device 2900 that may implement the features and processes described above. For example, computing device 2900 may determine and display location information and/or may receive location information from a server and display the received location information. The computing device 2900 may include a memory interface 2902, one or more data processors, image processors, and/or central processing units 2904, and a peripherals interface 2906. The memory interface 2902, the one or more processors 2904, and/or the peripherals interface 2906 may be separate components or may be integrated in one or more integrated circuits. The various components in the computing device 2900 may be coupled by one or more communication buses or signal lines.

Sensors, devices, and subsystems may be coupled to the peripherals interface 2906 to facilitate multiple functionalities. For example, a motion sensor 2910, a light sensor 2912, and a proximity sensor 2914 may be coupled to the peripherals interface 2906 to facilitate orientation, lighting, and proximity functions. Other sensors 2916 may also be connected to the peripherals interface 2906, such as a global navigation satellite system (GNSS) (e.g., GPS receiver), a temperature sensor, a biometric sensor, magnetometer, or other sensing device, to facilitate related functionalities.

A camera subsystem 2920 and an optical sensor 2922, e.g., a charged coupled device (CCD) or a complementary metal-oxide semiconductor (CMOS) optical sensor, may be utilized to facilitate camera functions, such as recording photographs and video clips. The camera subsystem 2920 and the optical sensor 2922 may be used to collect images of a user to be used during authentication of a user, e.g., by performing facial recognition analysis.

Communication functions may be facilitated through one or more wireless communication subsystems 2924, which can include radio frequency receivers and transmitters and/or optical (e.g., infrared) receivers and transmitters. For example, the BTLE and/or WiFi communications described above may be handled by wireless communication subsystems 2924. The specific design and implementation of the communication subsystems 2924 may depend on the communication network(s) over which the computing device 2900 is intended to operate. For example, the computing device 2900 may include communication subsystems 2924 designed to operate over a GSM network, a GPRS network, an EDGE network, a WiFi or WiMax network, and a Bluetooth™ network. For example, the wireless communication subsystems 2924 may include hosting protocols such that the device 2900 can be configured as a base station for other wireless devices and/or to provide a WiFi service.

An audio subsystem 2926 may be coupled to a speaker 2928 and a microphone 530 to facilitate voice-enabled functions, such as speaker recognition, voice replication, digital recording, and telephony functions. The audio subsystem 2926 may be configured to facilitate processing voice commands, voiceprinting, and voice authentication, for example.

The I/O subsystem 2940 may include a touch-surface controller 2942 and/or other input controller(s) 2944. The touch-surface controller 2942 may be coupled to a touch surface 2946. The touch surface 2946 and touch-surface controller 2942 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2946.

The other input controller(s) 2944 may be coupled to other input/control devices 2948, such as one or more buttons, rocker switches, thumb-wheel, infrared port, USB port, and/or a pointer device such as a stylus. The one or more buttons (not shown) may include an up/down button for volume control of the speaker 2928 and/or the microphone 2930.

In one implementation, a pressing of the button for a first duration may disengage a lock of the touch surface 2946; and a pressing of the button for a second duration that is longer than the first duration may turn power to the computing device 2900 on or off. Pressing the button for a third duration may activate a voice control, or voice command, module that enables the user to speak commands into the microphone 2930 to cause the device to execute the spoken command. The user may customize a functionality of one or more of the buttons. The touch surface 2946 can, for example, also be used to implement virtual or soft buttons and/or a keyboard.

In some implementations, the computing device 2900 may present recorded audio and/or video files, such as MP3, AAC, and MPEG files. In some implementations, the computing device 2900 may include the functionality of an MP3 player, such as an iPod™. The computing device 2900 may, therefore, include a 36-pin connector and/or 8-pin connector that is compatible with the iPod. Other input/output and control devices may also be used.

The memory interface 2902 may be coupled to memory 2950. The memory 2950 may include high-speed random access memory and/or non-volatile memory, such as one or more magnetic disk storage devices, one or more optical storage devices, and/or flash memory (e.g., NAND, NOR). The memory 2950 may store an operating system 2952, such as Darwin, RTXC, LINUX, UNIX, OS X, WINDOWS, or an embedded operating system such as VxWorks.

The operating system 2952 may include instructions for handling basic system services and for performing hardware dependent tasks. In some implementations, the operating system 2952 may be a kernel (e.g., UNIX kernel). In some implementations, the operating system 2952 may include instructions for performing voice authentication.

The memory 2950 may also store communication instructions 2954 to facilitate communicating with one or more additional devices, one or more computers and/or one or more servers. The memory 2950 may include graphical user interface instructions 2956 to facilitate graphic user interface processing; sensor processing instructions 2958 to facilitate sensor-related processing and functions; phone instructions 2960 to facilitate phone-related processes and functions; electronic messaging instructions 2962 to facilitate electronic-messaging related processes and functions; web browsing instructions 2964 to facilitate web browsing-related processes and functions; media processing instructions 2966 to facilitate media processing-related processes and functions; GNSS/Navigation instructions 2968 to facilitate GNSS and navigation-related processes and instructions; and/or camera instructions 2970 to facilitate camera-related processes and functions.

The memory 2950 may store application creation instructions 2972 to facilitate other processes and functions, such as the processes and functions as described above.

The memory 2950 may also store other software instructions 2974, such as web video instructions to facilitate web video-related processes and functions; and/or web shopping instructions to facilitate web shopping-related processes and functions. In some implementations, the media processing instructions 2966 may be divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 2950 may include additional instructions or fewer instructions. Furthermore, various functions of the computing device 2900 may be implemented in hardware and/or in software, including in one or more signal processing and/or application specific integrated circuits.

FIG. 30 is a block diagram of an example system architecture 3000 that may implement the features and processes described above. In some embodiments, computing device 2900 may cooperate with system architecture 3000 to implement the features and processes described above.

The architecture 3000 may be implemented on any electronic device that runs software applications derived from compiled instructions, including without limitation personal computers, servers, smart phones, media players, electronic tablets, game consoles, email devices, etc. In some implementations, the architecture 3000 may include one or more processors 3002, one or more input devices 3004, one or more display devices 3006, one or more network interfaces 3008, and one or more computer-readable mediums 3010. Each of these components may be coupled by bus 3012.

Display device 3006 may be any known display technology, including but not limited to display devices using Liquid Crystal Display (LCD) or Light Emitting Diode (LED) technology. Processor(s) 3002 may use any known processor technology, including but not limited to graphics processors and multi-core processors. Input device 3004 may be any known input device technology, including but not limited to a keyboard (including a virtual keyboard), mouse, track ball, and touch-sensitive pad or display. Bus 3012 may be any known internal or external bus technology, including but not limited to ISA, EISA, PCI, PCI Express, NuBus, USB, Serial ATA or FireWire. Computer-readable medium 3010 may be any medium that participates in providing instructions to processor(s) 3002 for execution, including without limitation, non-volatile storage media (e.g., optical disks, magnetic disks, flash drives, etc.), or volatile media (e.g., SDRAM, ROM, etc.).

Computer-readable medium 3010 may include various instructions 3014 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 3004; sending output to display device 3006; keeping track of files and directories on computer-readable medium 3010; controlling peripheral devices (e.g., disk drives, printers, etc.) which can be controlled directly or through an I/O controller; and managing traffic on bus 3012. Network communications instructions 3016 may establish and maintain network connections (e.g., software for implementing communication protocols, such as TCP/IP, HTTP, Ethernet, etc.).

An application creation system 3018 can include instructions that may facilitate the systems and processes described above.

Application(s) 3020 may be an application that uses or implements the processes described above, in some embodiments (e.g., a completed application created as described above). The processes may also be implemented in operating system 3014.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may implement or be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

CONCLUSION, RAMIFICATIONS, AND SCOPE

A person skilled in the art of programming will recognize that the system described herein could be implemented in and for many different platforms besides a web browser as shown in FIGS. 1A, 1B, 19A, and 19B. For instance, this system could be implemented in and for platforms as basic as the BASH command line interpreter, and as complex as the Java Spring GUI platform and Microsoft .NET platform. Also, a single application definition may be created that may be paired with application interpreter modules configured to be used in different platforms.

A person skilled in the art of programming will recognize that applications for creating application and service definitions could be generated by different methods. An application generated by this system does not need to be used to create an application or service definition. However, the ability of this system to support and generate both general purpose applications and development interface applications does offer some advantages. For instance, this may allow for live previews to be easily created within a development interface. It may also facilitate the progressive improvement and specialization of new development interfaces.

A person skilled in the art of programming will recognize that a multi-tenant application service may provide services for many different applications, and provide many different services for a single application. An application service may also be used by applications not built using this system. Applications that do not make use of application services may also be created.

What is claimed is:

1. A method of building a software application, the method comprising:
   storing, in a database, a plurality of object definitions, each object definition defining an object configured to cause an executing processor to perform specific processing when executed;
   causing, by a hardware processor, a user interface to be displayed;
   receiving, by the hardware processor from a user via the user interface, a selection of a second plurality of object definitions forming a subset of the plurality of the object definitions and a user input specifying at least one relationship between the plurality of the object definitions;
   creating, by the hardware processor, an application definition comprising the selected second plurality of object definitions and the at least one relationship of the selected second plurality of object definitions based on the selection and the user input; and
   providing, by the hardware processor, an application interpreter configured to enable the executing processor to process the application definition,
   wherein the software application includes the application definition and the application interpreter.

2. The method of claim 1, wherein the application comprises an application programming interface (API).

3. The method of claim 1, wherein at least one of the object definitions comprises a plurality of the object definitions assembled into a single object definition, the at least one of the object definitions being an application event procedure definition comprising procedures executed by the executing processor to generate a new object, and the at least one relationship of the selected object definitions is created by one or more references stored in the respective object definitions.

4. The method of claim 1, further comprising:
   receiving, by the hardware processor from the user interface, a modification to at least one of the object definitions,
   wherein the application definition created by the hardware processor is further based on the modification.

5. The method of claim 4, wherein the modification comprises a selection of at least one of the object definitions to be incorporated into or removed from the at least one object definition being modified.

6. The method of claim 1, further comprising:
   receiving, by the hardware processor from the user interface, data defining a previously undefined object configured to cause the executing processor to perform new specific processing when executed; and
   creating, by the hardware processor, a new object definition using the received data.

7. The method of claim 6, further comprising storing, by the hardware processor, the new object definition in the database.

8. The method of claim 6, further comprising adding, by the hardware processor, the new object definition to the selection of the plurality of the object definitions.

9. The method of claim 1, further comprising previewing, by the hardware processor in the user interface, the software application.

10. A method comprising executing, by the executing processor, the software application of claim 1.

11. A system for building a software application, the system comprising:
    a database configured to store a plurality of object definitions, each object definition defining an object configured to cause an executing processor to perform specific processing when executed; and
    a hardware processor configured to:
       cause a user interface to be displayed;
       receive, from a user via the user interface, a selection of a second plurality of object definitions forming a subset of the plurality of the object definitions and a user input specifying at least one relationship between the plurality of the object definitions;
       create an application definition comprising the selected second plurality of object definitions and the at least one relationship of the selected second plurality of object definitions based on the selection and the user input; and
       provide an application interpreter configured to enable the executing processor to process the application definition,
    wherein the software application includes the application definition and the application interpreter.

12. The system of claim 11, wherein the application comprises an application programming interface (API).

13. The system of claim 11, wherein at least one of the object definitions comprises a plurality of the object definitions assembled into a single object definition, the at least one of the object definitions being an application event procedure definition comprising procedures executed by the executing processor to generate a new object, and the at least one relationship of the selected object definitions is created by one or more references stored in the respective object definitions.

14. The system of claim 11, wherein the hardware processor is further configured to:
    receive, from the user interface, a modification to at least one of the object definitions,
    wherein the application definition created by the hardware processor is further based on the modification.

15. The system of claim 14, wherein the modification comprises a selection of at least one of the object definitions to be incorporated into or removed from the at least one object definition being modified.

16. The system of claim 11, wherein the hardware processor is further configured to:
    receive, from the user interface, data defining a previously undefined object configured to cause the executing processor to perform new specific processing when executed; and
    create a new object definition using the received data.

17. The system of claim 16, wherein the hardware processor is further configured to store the new object definition in the database.

18. The system of claim 16, wherein the hardware processor is further configured to add the new object definition to the selection of the plurality of the object definitions.

19. The system of claim 11, wherein the hardware processor is further configured to preview, in the user interface, the software application.

20. A system comprising an executing processor configured to execute the software application of claim 11.

* * * * *